US012704953B2

United States Patent

Tandon et al.

(12) United States Patent
(10) Patent No.: US 12,704,953 B2
(45) Date of Patent: Aug. 11, 2026

(54) SCROLLING INTERFACE CONTROL FOR COMPUTER DISPLAY

(71) Applicant: Warner Bros. Entertainment Inc., Burbank, CA (US)

(72) Inventors: Prem V. Tandon, Clifton, NJ (US); Robert Joseph Kamphausen, Jr., Hoboken, NJ (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

(21) Appl. No.: 16/869,571

(22) Filed: May 7, 2020

(65) Prior Publication Data

US 2020/0341607 A1 Oct. 29, 2020

Related U.S. Application Data

(63) Continuation of application No. PCT/US2018/054255, filed on Oct. 3, 2018.

(60) Provisional application No. 62/582,770, filed on Nov. 7, 2017.

(51) Int. Cl.
*G06F 3/0485* (2022.01)
*G06F 3/0483* (2013.01)

(52) U.S. Cl.
CPC .......... *G06F 3/0485* (2013.01); *G06F 3/0483* (2013.01)

(58) Field of Classification Search
CPC ... G06F 3/0485; G06F 3/04883; G06F 3/0483
See application file for complete search history.

(56) References Cited

U.S. PATENT DOCUMENTS

| | | | | |
|---|---|---|---|---|
| 6,975,306 | B2 | 12/2005 | Hinckley et al. | |
| 10,235,035 | B2 * | 3/2019 | Karunamuni | G06F 3/0488 |
| 10,372,317 | B1 * | 8/2019 | Arnold | G06F 3/04847 |
| 10,536,414 | B2 * | 1/2020 | Dye | G06F 3/0482 |
| 2003/0142081 | A1 | 7/2003 | Iizuka et al. | |
| 2004/0125088 | A1 | 7/2004 | Zimmerman et al. | |
| 2006/0038796 | A1 * | 2/2006 | Hinckley | G06F 3/04855 345/173 |
| 2008/0052945 | A1 * | 3/2008 | Matas | H04N 1/00411 34/173 |
| 2008/0168349 | A1 * | 7/2008 | Lamiraux | H04M 1/72436 715/702 |

(Continued)

FOREIGN PATENT DOCUMENTS

WO WO PCT/US2018/054255 1/2019

*Primary Examiner* — Justin R. Blaufeld
(74) *Attorney, Agent, or Firm* — Bookoff McAndrews, PLLC

(57) ABSTRACT

Methods and apparatus control scrolling of graphical content arranged in a sequence of panels by a computer responsive to a user input device. A method includes sensing, by the computer, a direction and length of continuous cursor movement along a first axis of the user input device. The method further includes progressing display of the graphical content through the sequence of panels based on the direction and length of the continuous cursor movement. The user input device may be a touchscreen or a touchpad and the computer may determine the cursor location based on a one-finger touch registered by the user input device. The method enables the user to scroll through panels of graphical content using a reduced number of finger taps and smaller movements, reducing hand and finger fatigue.

17 Claims, 16 Drawing Sheets

(56) References Cited

U.S. PATENT DOCUMENTS

| | | | | |
|---|---|---|---|---|
| 2009/0109243 | A1* | 4/2009 | Kraft | G06F 3/0488 345/660 |
| 2010/0318895 | A1* | 12/2010 | Steinberger | G06T 3/02 715/234 |
| 2011/0080351 | A1* | 4/2011 | Wikkerink | G06F 3/04847 715/764 |
| 2012/0030625 | A1* | 2/2012 | Miyazaki | G06F 3/0488 715/830 |
| 2012/0108328 | A1* | 5/2012 | Konno | H04N 13/398 463/31 |
| 2012/0131463 | A1* | 5/2012 | Lefler | G06T 13/80 345/473 |
| 2012/0233565 | A1* | 9/2012 | Grant | G06F 3/0483 715/776 |
| 2012/0311507 | A1* | 12/2012 | Murrett | G06F 40/166 715/863 |
| 2013/0031506 | A1* | 1/2013 | Diaz | G06Q 50/12 715/781 |
| 2013/0111395 | A1* | 5/2013 | Ying | G06F 3/0483 715/783 |
| 2013/0185642 | A1* | 7/2013 | Gammons | G06F 3/04817 715/765 |
| 2013/0268847 | A1* | 10/2013 | Kim | G06F 3/0483 715/251 |
| 2014/0040776 | A1* | 2/2014 | Dann | G06F 3/0485 715/753 |
| 2014/0075286 | A1* | 3/2014 | Harada | G06F 40/103 715/234 |
| 2014/0143738 | A1* | 5/2014 | Underwood, IV | G06F 3/04883 715/863 |
| 2014/0258911 | A1* | 9/2014 | Pallakoff | G06T 11/60 715/776 |
| 2014/0362056 | A1* | 12/2014 | Zambetti | G06F 3/04883 345/179 |
| 2014/0380237 | A1* | 12/2014 | Kroupa | G06F 3/04883 715/781 |
| 2015/0007066 | A1* | 1/2015 | Joo | G06F 3/1423 715/761 |
| 2015/0121300 | A1* | 4/2015 | Wang | G06F 3/04883 715/790 |
| 2015/0169161 | A1* | 6/2015 | Moon | G06F 3/0488 715/785 |
| 2015/0370455 | A1* | 12/2015 | Van Os | G06F 3/04886 345/173 |
| 2016/0018981 | A1* | 1/2016 | Amerige | G06F 3/04817 715/863 |
| 2016/0062584 | A1* | 3/2016 | Cohen | G06F 3/0485 715/784 |
| 2016/0110048 | A1* | 4/2016 | Terleski | G06F 3/0485 715/767 |
| 2017/0068402 | A1* | 3/2017 | Lochhead | H04N 21/47217 |
| 2017/0344205 | A1* | 11/2017 | Geller | G06F 3/0488 |
| 2018/0024716 | A1* | 1/2018 | Kim | G06F 3/0488 715/745 |
| 2018/0190037 | A1* | 7/2018 | Sou | G06F 3/012 |
| 2019/0332237 | A1* | 10/2019 | Diakov | G06F 16/54 |

* cited by examiner

Y
500Q
512
no-let-go-panel-changing | X: 246.0 | Y: 694.0 | Xv: 0.158 | Yv: 0.033 | Prg: *** | Size: 0.0
Petes 2nd File ④
DC Fever
100% 2:08
Landscape Fit
VERY WELL, FLAG.
00:16
X
550
570K 500S
512
no-let-go-panel-changing
X: 301.0
Y: 683.0
Xv: 0.079
Yv: 0.035
Prg: ***
Size: 0.0
Petes 2nd File④
DC Fever
100%
2:08
Landscape Fit
VERY WELL, FLAG.
00:18
550
570M 510
500T
no-let-go-panel-changing
X: 457.0
Y: 670.0
Xv: 0.131
Yv: 0.017
Prg: ***
Size: 0.0
Petes 2nd File④
DC Fever
100%
2:08
Landscape Fit
ENCHANTRESS! YOU'RE UP! BIND HIM! SEND HIM TO HELL OR SOMETHING!
00:20
570N
550

Y
514
500U
no-let-go-panel-changing
X: 165.0
Y: 691.0
Xv: 0.069
Yv: 0.0
Prg: ***
Size: 0.0
Petes 2nd File④
DC Fever
100% 2:08
Landscape Fit
AND BLOOD AND–
THIS MONOLOGUE IS GOING TO MAKE CROC HURL AGAIN!
00:20
X
550
570O
516
518

Y
516
500V
no-let-go-panel-changing
X: 143.0
Y: 672.0
Xv: 0.140
Yv: 0.014
Prg: ***
Size: 0.0
Petes 2nd File④
DC Fever
100% 2:08
Landscape Fit
SILENCE!
00:20
X
550
570P

SCROLLING INTERFACE CONTROL FOR COMPUTER DISPLAY

RELATED APPLICATIONS

This application is a continuation of international (PCT) application No. PCT/US2018/054255, filed Oct. 3, 2018, which claims priority to U.S. provisional patent application Ser. No. 62/582,770 filed Nov. 7, 2017, the disclosures of which are incorporated herein by reference in their entireties.

FIELD

The present disclosure relates to methods and apparatus for user interface control of computer-generated displays, and more particularly to a scrolling interface display.

COPYRIGHT NOTICE

The applicant has no objection to copying of the Figures as part of this patent application once published, but otherwise reserves all rights to content illustrated therein.

BACKGROUND

Various scrolling control procedures are known for controlling a computer display of static or animated computer-generated images. Scrolling is useful when the resolution of the image, document, or video on display exceeds the resolution of the display screen, or when the user desires to view an image at a greater magnification than will permit display of the entire image. With mobile devices and small screens, scrolling is practically indispensable for viewing large documents.

Digital comic books and graphic novels often require intensive scrolling. To see the detail in each panel of the graphic novel via a small screen of a mobile device, the user scrolls both vertically and horizontally. Mobile devices are equipped with touchscreens, with operating systems that recognize right/left and up/down "swipes" as scrolling actions. Swipes include sequences in which the user touches the screen with a finger, moves the finger right, left, up, or down, and then lifts the finger. The mobile device will respond by scrolling the display in the direction of finger movement. Another gesture used in content navigation is the finger tap. The user taps on the right or left side of the screen to turn a page forward or back. Consumption of content such as comic books or graphic novels on small touchscreen devices can entail frequent scrolling. Over time, the user may find that the frequent swiping causes fatigue in the fingers and wrist, and frequent tapping can cause soreness at the fingertip.

It would be desirable, therefore, to develop a new method for controlling scrolling of a video display, and particularly of a touchscreen display that overcomes these and other limitations of the prior art and enhances user comfort while scrolling repetitively.

SUMMARY

This summary and the following detailed description are complementary parts of an integrated disclosure and may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as will be apparent from the respective disclosures.

The present disclosure describes a method and apparatus for controlling scrolling of graphical content arranged in a sequence of panels by a computer responsive to a user input device. The method may include sensing, by the computer, a direction and length of continuous cursor movement along a first axis of the user input device. The method may further include progressing display of the graphical content through the sequence of panels based on the direction and length of the continuous cursor movement. This novel method of scroll control is configured for use in panel mode, described below.

The method may support viewing content arranged in pages that are further subdivided into panels or sub-regions in two different modes, called page mode and panel mode (also called panel-by-panel mode). As used herein, a "sub-region" is a panel without drawn borders used for scrolling through portions of a page. In page mode, the computer displays each entire page including multiple panels or sub-regions on the screen at one time, and transitions between pages of a sequence in response to user input. In panel mode, the computer displays each entire panel or sub-region exclusively, and transitions between panels or sub-regions in response to user input. Known scroll control methods may be used while the user interface is in page mode. For example, the method may further include panning display of the graphical content along a second axis of the user input device perpendicular to the first axis, based on a direction and length of continuous cursor movement along the second axis. The method may include switching between page mode and panel mode (also called panel-by-panel mode) in response to user input, e.g., a double-tap, prolonged touch, or other distinct input. For example, the method may include changing a mode of response to the user input device from page mode to panel-by-panel mode, or back again, in response to receiving a user input indicating a mode transition. As used herein, a "tap" means a light strike or light blow. A "touch" includes taps and other, non-tapping forms of momentary contact.

In another aspect, the user input device may be, or may include, a touchscreen or a touchpad, and the method may further include determining, by the computer, whether the cursor is active, and determining a current location of the cursor based on a one-finger touch registered by the user input device (touchpad or touchscreen). For example, the user input device may be, or may include, a touchscreen on which the graphical content is displayed, and the first axis may be aligned with a lower touchscreen edge. In an alternative, or in addition, the user input device may be, or may include, a touchpad adjacent to a screen on which the graphical content is displayed and the first axis may be aligned with an edge of the touchpad corresponding to a lower edge of the screen. In a related aspect, the method may include automatically selecting, by the computer, one of the sequence of panels for initial display based on correspondence with a location on the user input device where the one finger touch is first detected after an interruption of finger contact. For example, if a user touches a touchscreen within the boundary of "Panel 1," the computer may determine the location of the finger touch relative to all panels visible on the touchscreen and select "Panel 1" based on determining that the touch occurred within its boundary.

In an aspect of the method, the progressing may further include determining if the length of the continuous cursor movement parallel to the first axis exceeds a threshold and if the threshold is exceeded, progressing to one of a next panel or last panel of a panel sequence based on the direction. In such embodiments, the method may further include setting the threshold in response to user input, and/or toggling the directions of movement for forward and reverse progress through the panel sequence in response to user input. This aspect enables the user to progress through the panels without lifting their finger from the screen or touchpad.

The method may be implemented in any suitable programmable computing apparatus, by provided program instructions in a non-transitory computer-readable medium that, when executed by a computer processor, cause the apparatus to perform the described operations. An apparatus may include a mobile device, for example a smart phone or notepad computer, and similar computing devices equipped with touchscreens.

To the accomplishment of the foregoing and related ends, one or more examples describe and enable features pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

The computer-implemented methods described herein may be programmed in an application for reading digital graphical content (e.g., graphic novels and serials) using a smart phone, tablet computer, or similar client device used to read content stored locally or remotely from the client. In page mode, the application may detect standard finger taps to page backwards or forwards through paginated content based on the location of the finger tap on a touchscreen or touchpad. Page mode may include a sub-mode referred to herein as “landscape fit mode” that configures the content for display on a rectangular screen held landscape orientation (long edges defining bottom and top of the display) and may use modified navigational controls. In panel or page mode, pinch and pull gestures as known in the art may be used to zoom in and out. In panel mode, the reader application enables users to “scrub” forwards and backwards through a sequence of panels almost as if manipulating a scrubber bar through frames of video content. However, the content is not arranged in video format, the reader application generates no visible or hidden scrubber bar, and panel progression does not depend on manipulation of any icon (e.g., of a pointer on a scrubber bar). The reader application may support input from other devices, for example, keyboards, gamepads, remote controllers and mixed reality controllers. The reader application may support further functions, for example, bookmarks stored in a cloud server, zoom, user discussions and lists, favorites, annotations, and auto play.

Figure 1:
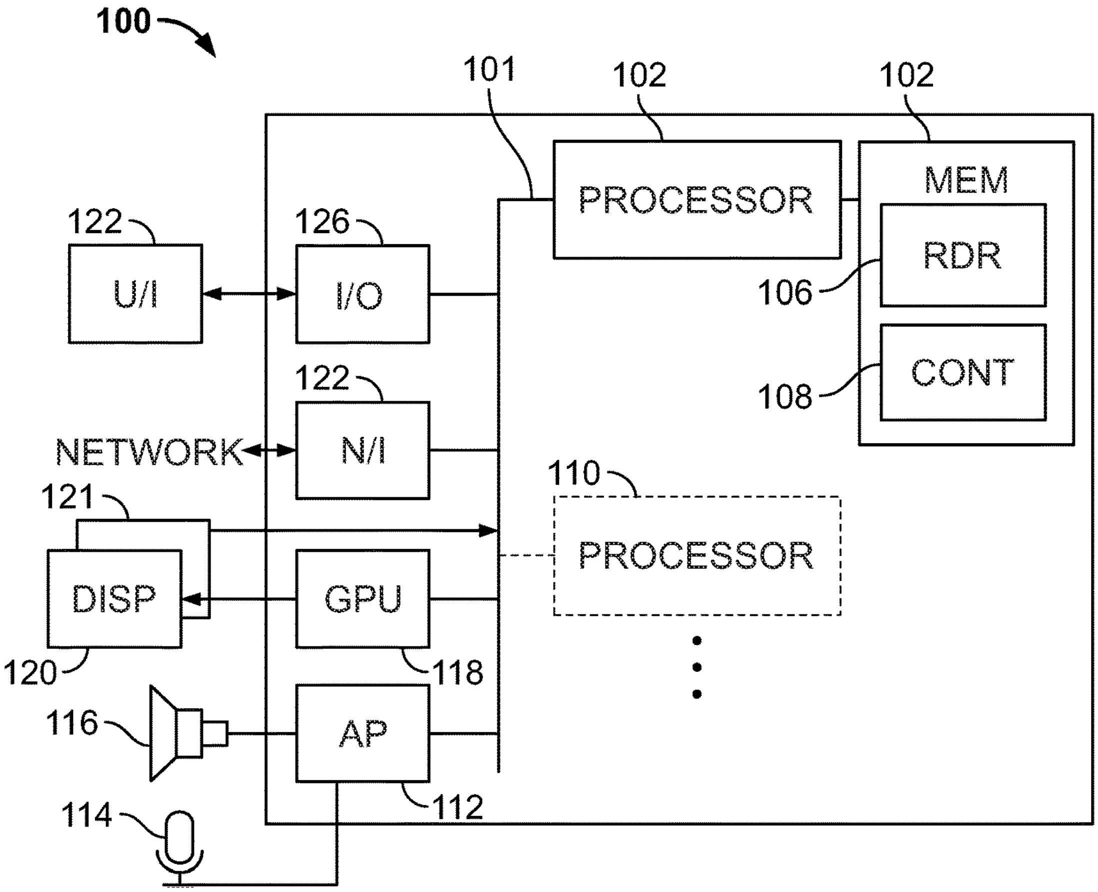
FIG. 1 is a block diagram showing a client device suitable for implementing a new scrolling method.

FIG. 1 shows an example of a client device 100 suitable for implementing the new control method for display of paginated and subdivided graphical content. The client device 100 may include one or more hardware or firmware processors 102 coupled to a memory 104 holding a reader application 106 and electronic paginated/paneled content 108, also referred to herein as a “e-book.” In an alternative, the client device 100 may include multiple parallel processors 102, 110. Each processor is coupled to components of the client device 100, including at least the memory 104 holding the reader 106 and content 108.

Components of the client device 100 may be coupled to one another or to the one or more processors 102, 110 via an internal bus 101. The client device 100 may further include one or more input/output ports 126 (e.g., USB or other serial port, Lightning™ port by Apple Corp., etc.) each coupled to a user input device 122. A user input device may include, for example, a touchscreen interface, a touchpad interface, a keyboard or keypad, a pointing device (e.g., a computer mouse or joystick), an eye position sensor (e.g., for a mixed reality client), or a microphone (e.g., the depicted microphone 114). More commonly in portable devices, user input devices may be coupled to the processor 102 or processor 110 via a non-serial interface, for example, a touchscreen 121 may be coupled via a graphic processing unit 118 and internal bus and a microphone 114 may be coupled via an audio processing unit 112. The user input devices convert physical actions by a user into an electrical signal that can be interpreted by a processor of the client 100 as a command or as data. Semantic interpretation of the electrical signals may be supplied by any suitable user interface application, for example, the reader application 106 that generates a GUI for display by a display device 120, or an audible interface application that interprets speech or other audible signals picked up by the microphone 114. Semantic interpretation of input signals may also be performed by lower-level components, for example, operating systems and device drivers.

The client device 100 may further include one or more network interfaces 122 (e.g., an Ethernet, or wireless network interface controller (WNIC)) for communicating with servers or other nodes of an external network. The client device 100 may further include one or more graphic processing units 118 for supplying a video signal to a display device 120. A display device may include, for example, a display screen of a smartphone or notepad computer, a computer monitor or video display screen, a digital projector, or a dedicated mixed reality display. A touchscreen device 121 may be coupled to the display 120, for converting touch input into location and movement signals. The client device 100 may further include one or more audio processors 112 for driving, based on digital input from the processor 102 and/or 110, an audio output transducer 116 that generates audio (e.g., speech, music, or sound effects) for hearing by a user of the client device 100. An audio processor 112 may be configured to receive an audio signal picked up by a microphone 114 and convert it to a digital signal for processing by the processor 101 and/or 110.

In an aspect, the client device 100 may further include one or more sensors (not shown) in addition to the microphone 114 that generate digital data indicative of a physical state or environment of the client device. The one or more sensors may be coupled to the processor 102 and/or 110 and supply digital data to the processor or processors for use as programmed. The processor may receive signals from user input devices 122 and generate one or more processed data objects based on user input device signals. Processed data objects from user interface signals may include, for example, touch event, touch removal event, frequency of touch events, and touch location and movement. The processors 102 and/or 110 may cache each of the foregoing processed data objects in the memory 104 for use by the processor in real time control of graphic output for the display 120, including scrolling of graphical content 108 divided into pages and sub-page regions such as panels or regions.

In another aspect, the memory 100 may hold a reader application 106, or components thereof. Components may include, for example, JavaScript™ or other script-based components of a web-based application. The reader application 106 may hold instructions that when executed by the processor 102 (or by multi-processors 102, 110, etc.) cause the apparatus to perform functions related to viewing or using the content 108, for example, content navigation functions such as controlling scrolling or otherwise progressing through the content 108 in response to user input received via the one or more user input device 122, using more detailed algorithms as described herein.

Figure 2:
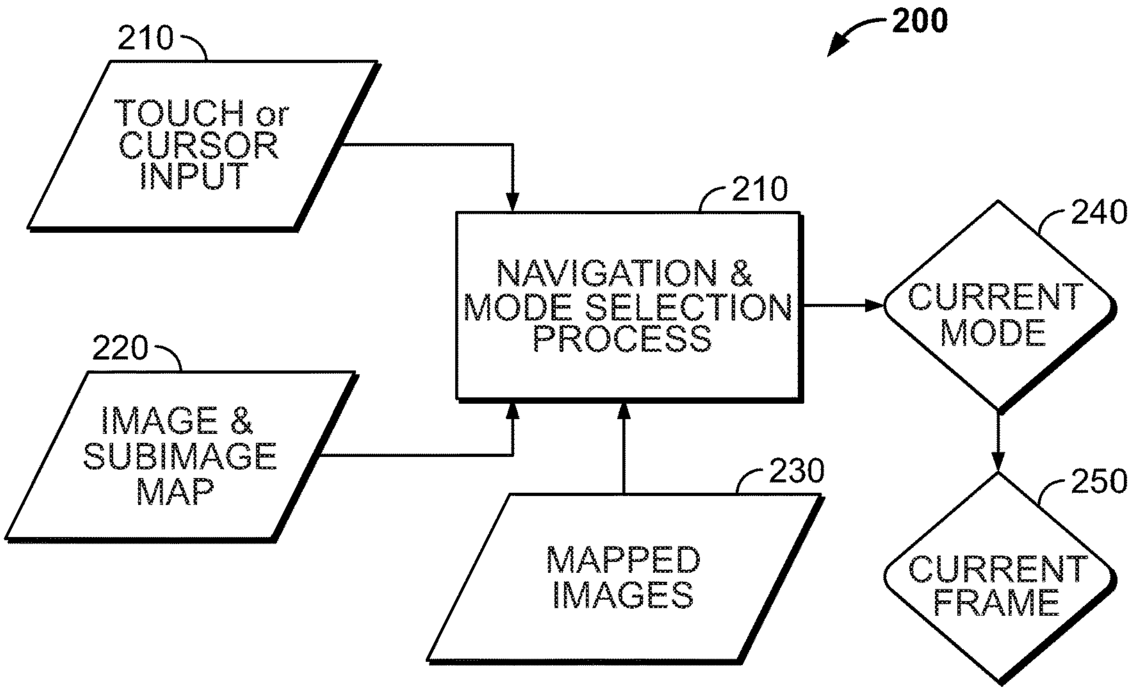
FIG. 2 is a block diagram showing an inputs and outputs of a scrolling method by a client device.

FIG. 2 shows an overview of a content navigation function 200 performed by executing a reader application 106 on a client device 100. The function 200 may be provided with at least three inputs: touch or cursor input 210 generated by a user input device such as a touchscreen or touchpad in response to user input; a data map or table 220 that specifies page sequence, page boundaries, panel (e.g., sub-page or sub-image region) sequence, and panel boundaries from local or remote data storage; and the image data 230 that is organized and divided by the image/sub-image map 220. The data map 220 and images 230 together make up an instance of digital graphics content 108 associated via a data structure (e.g., a file, a file folder, or a relational database). The device processor performs a navigation and mode selection process 210 using these inputs. The process 210 has two outputs: a current reading mode 240 for the content 108 and a current image for display (referred to herein as a "frame") 250 generated in real time by the device processor applying a scroll control algorithm to the content 108 in response to user input received via the interface 126 and user input device 122. The reading mode determines how user input gestures are interpreted and used to navigate through the digital graphics content.

Figure 3:
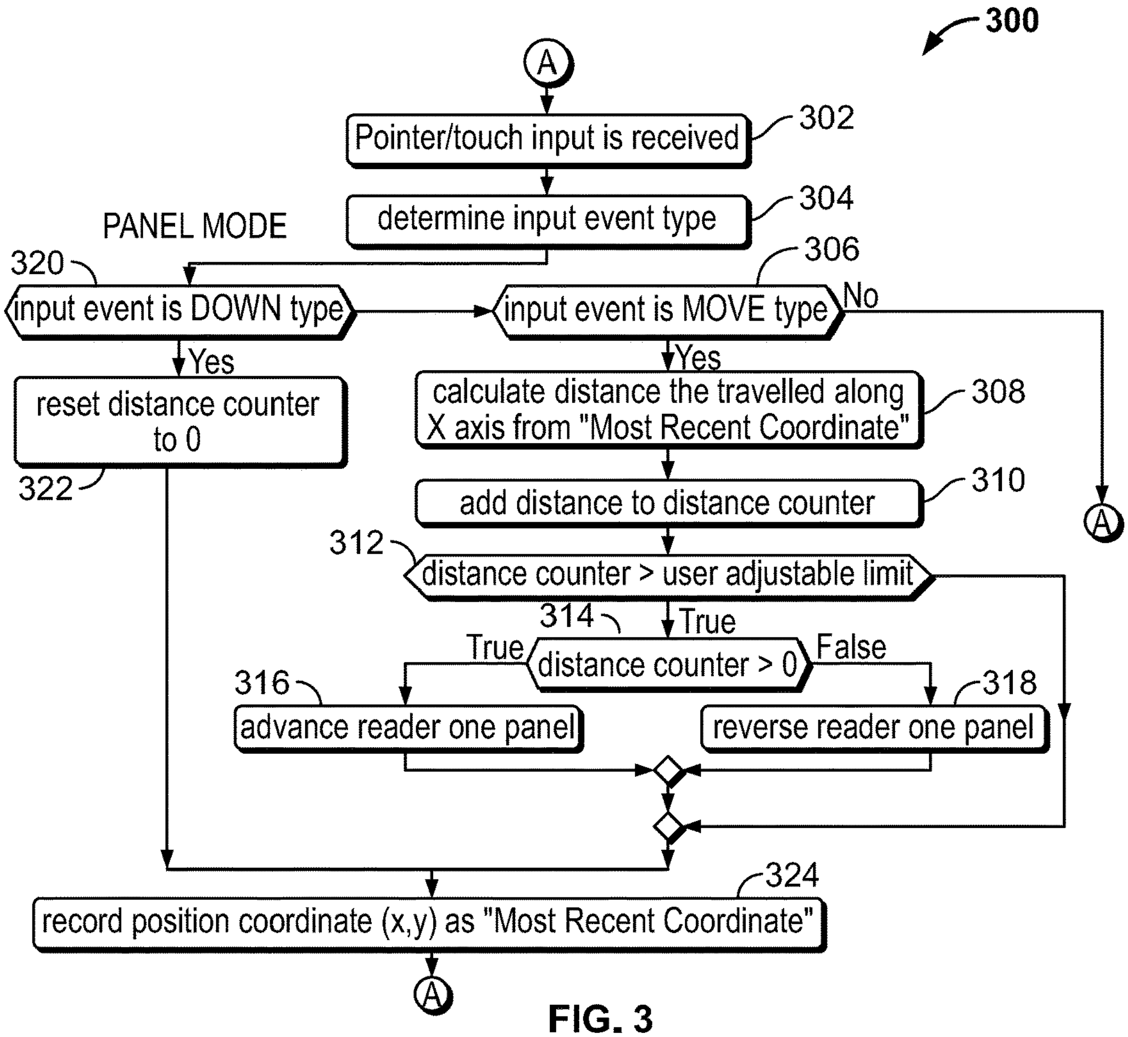
FIG. 3 is a flowchart showing a scroll control algorithm for controlling scrolling of graphical content arranged in a sequence of panels by a computer responsive to a user input device.

FIG. 3 shows a computer-implemented scroll control algorithm (method) 300 for controlling scrolling of graphical content arranged in a sequence of panels by a computer responsive to a user input device. The method 300 initiates at upper node 'A' representing entry into panel-by-panel mode. The initial display mode for content 108 may depend on the display parameters of the device in use. For example, when opening an e-book, the reader may load the latest bookmark for the e-book that was last recorded, determine the start position for the e-book based on the bookmark or lack thereof, and select an initial operating mode, for example, page or panel. If there are no bookmarks or the e-book is completely read, the initial page or panel should be the first in the page or panel sequences defined by the data map 220. For phones & televisions, the reader may open the e-book in panel-by-panel mode. For tablets and other high resolutions screens, the reader may open the e-book in page mode. Once opened and put into panel mode, the controller waits for cursor control (e.g., touch) input.

At 302, the controller receives cursor control or touch input, for example, the display's touchscreen may indicate a location of a single-finger touch. Many different touch gestures are known in the art, and any suitable gesture may be used. The algorithm 300 illustrates handling of a one-finger touch for scroll control, without excluding other response algorithms for other gestures. At 304, the processor determines an event type of the detected gestures, for example, a new one-finger touch ("DOWN" event), or movement of a finger across the display ("MOVE" event). At 320, if the event type is DOWN, at 322 the processor resets a distance counter to zero, at 324 records the current position coordinate (e.g., x,y Cartesian pair) on the 2D screen in a memory location, labeled here "Most Recent Coordinate," and loops back to terminal 'A' to wait for the next input event.

At 306, if the event type is MOVE, at 308 the processor calculates distance and sign of the move traveled along the 'X' axis in any convenient measure, e.g., pixels. As used herein, the 'X' axis is an axis parallel to the bottom or top edges of a rectangular screen, wherein the bottom edge of the image frame is aligned with the bottom screen edge. The 'Y' axis is perpendicular to the 'X' axis in the plane of the display. The sign may be positive for leftward movement and negative for rightward movement, or vice-versa. In an aspect, the correlation between sign and direction of movement is user-determinable, to accommodate different preferences of the reader. If the event type is something other than DOWN or MOVE, the processor executes a different control algorithm (not shown) or loops back to terminal 'A' to await further input.

At 310, the processor adds the distance to the distance counter. If the sign of the movement is negative, this decreases the counter value. If positive, the value increases. At 312, the processor determines whether the counter value exceeds a positive limit or a negative limit. In an aspect, the positive and negative limits are user-determinable. The lower the limit, the more quickly the scrolling action will respond to finger movement. The positive and negative limits may have the same absolute value, or different absolute values. If the value does not exceed a limit, the processor loops to block 324, recording the Most Recent Coordinate and waits for further input at terminal 'A'.

At 314, if the counter value exceeds a limit, the processor scrolls the e-book forward or backwards one panel. If the counter value is positive, the processor at 316 advances the reader one panel forward. If the counter value is negative, the processor at 318 reverses the reader one panel backwards. Once the panel is advanced forwards or backwards, the processor loops to block 324, previously described.

Figure 4:
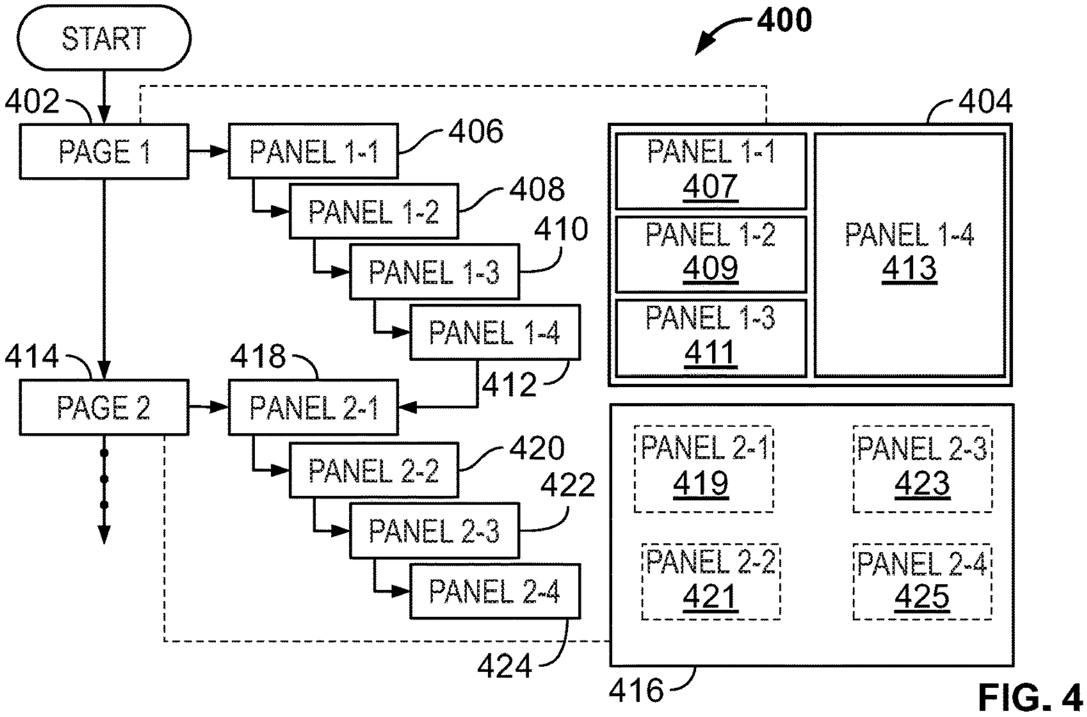
FIG. 4 is a block diagram illustrating organization of graphical content for use in a method for controlling scrolling of graphical content arranged in a sequence of panels by a computer responsive to a user input device.

The algorithm 300 makes use of page and panel or sub-region divisions defined for the e-book. Typically, the content producer defines the divisions as part of content authoring. However, the processor may, in an alternative, determine divisions algorithmically on the fly. For example, each different image file could be treated as a page and divided into regions at runtime based on marking inside the image, or based on some other image characteristic (e.g., a percentage of image width or height, or some other detected image feature). FIG. 4 shows an organization of graphical content 400 for use in the methods 300 or 600 described herein, which may also be referred to as a 'map." The organization of the map 400 may be determined explicitly by a human or artificial intelligence agent during authoring or may be implied and made explicit only at runtime. The graphical content 400 may comprise a sequence of pages 402, 414 (two of many shown) designed to be paged through at a user-determined pace that can vary with each page. The first page includes a sequence of panel indicators 406, 408, 410, 412 for panels making up the page 402 content. The panel indicators 406, 408, 410, 412 are in a separate sequence that connects directly to panel sequences associated with subsequent or antecedent pages. For example, the last panel 412 associated with the first page 402 can be linked directly to the first panel 418 of the next page 414.

The page 402 may be associated via a data structure with a graphical image 404 divided up into the panels 407, 409, 411, and 413 separated by borders in the style of a comic book. While four panels are shown, it should be appreciated that any non-zero number of panels may be useful. Most comic book content will have panels numbering between 1 and about 12. Although there is no specific upper limit to the number of panels on a page, pages usually are created with standard pixel dimensions (X,Y) so the number of panels should not exceed what enables panel sizes large enough to be useful for dialog (e.g., word balloons) and graphic storytelling. The panel indicators 406, 408, 410, 412 may define the location and extent of each panel, and may be determined manually (e.g., by the artist) or automatically (e.g., by image analysis of the page's graphic image 404). In most digital comic books, most page images include multiple panels with borders.

Some pages may not include any constituent panels, for example a single or multiple page spread that includes artwork without borders. The second page indicator 414 refers to a graphical image 416 without borders, which if viewed in its entirety on a small screen will result in loss of detail or details that are too small for some readers to make out. Nonetheless, the page indicator 414 is associated with a sequence of panel indicators 418, 420, 422, 424 that indicate corresponding borderless image regions 419, 421, 423, 425 of the page image 416. The image regions may have a location and extent like bordered panels, but without being limited by border geometry. For example, the regions 419, 421, 423, 425 may be separated by various amounts, or may overlap one another. Thus, the map 400 enables the user to progress both through the page sequence while in page mode or through the panel sequence while in panel mode. The map 400 defines both sequences.

Figure 5A:
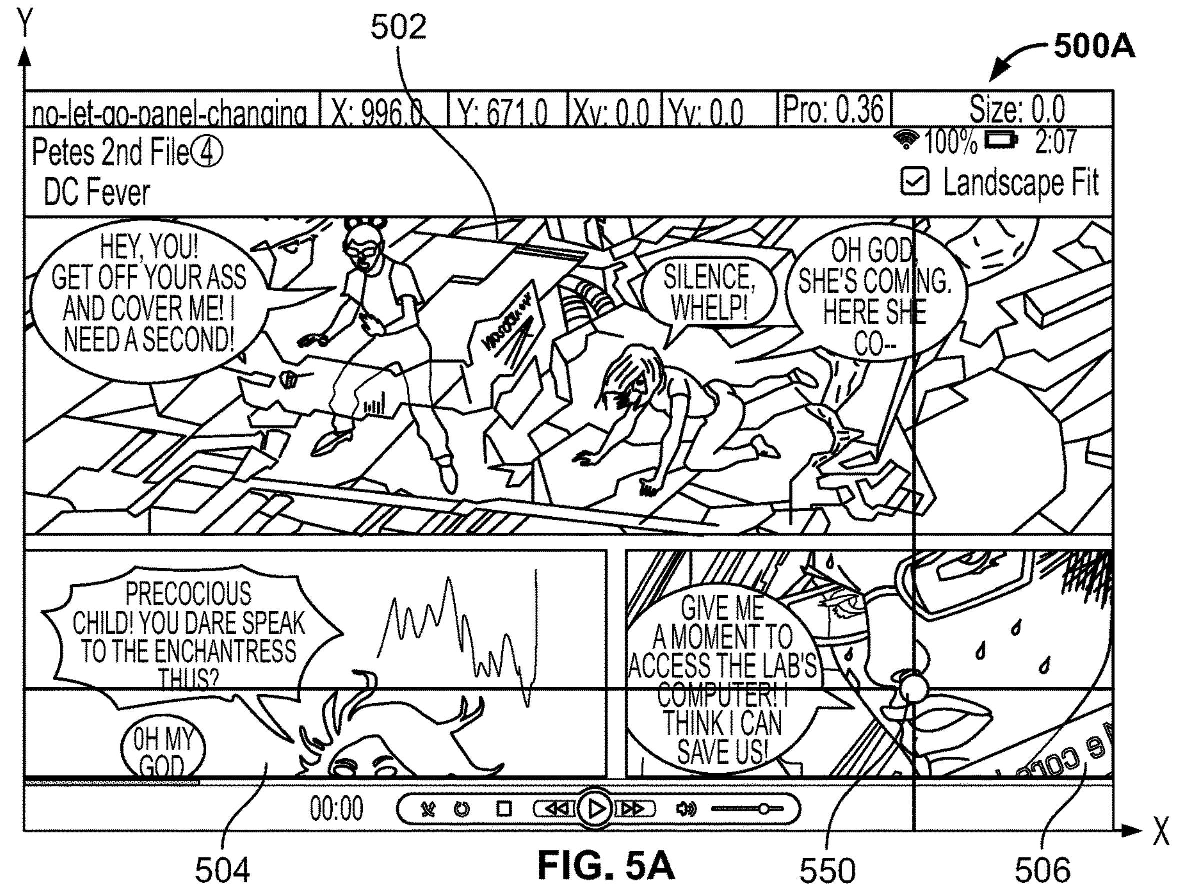
FIGS. 5A-V are screenshots illustrating screen movement relative to finger movement and touch placement for controlling scrolling of graphical content arranged in a sequence of panels by a computer responsive to a user input device.
Figure 5B:
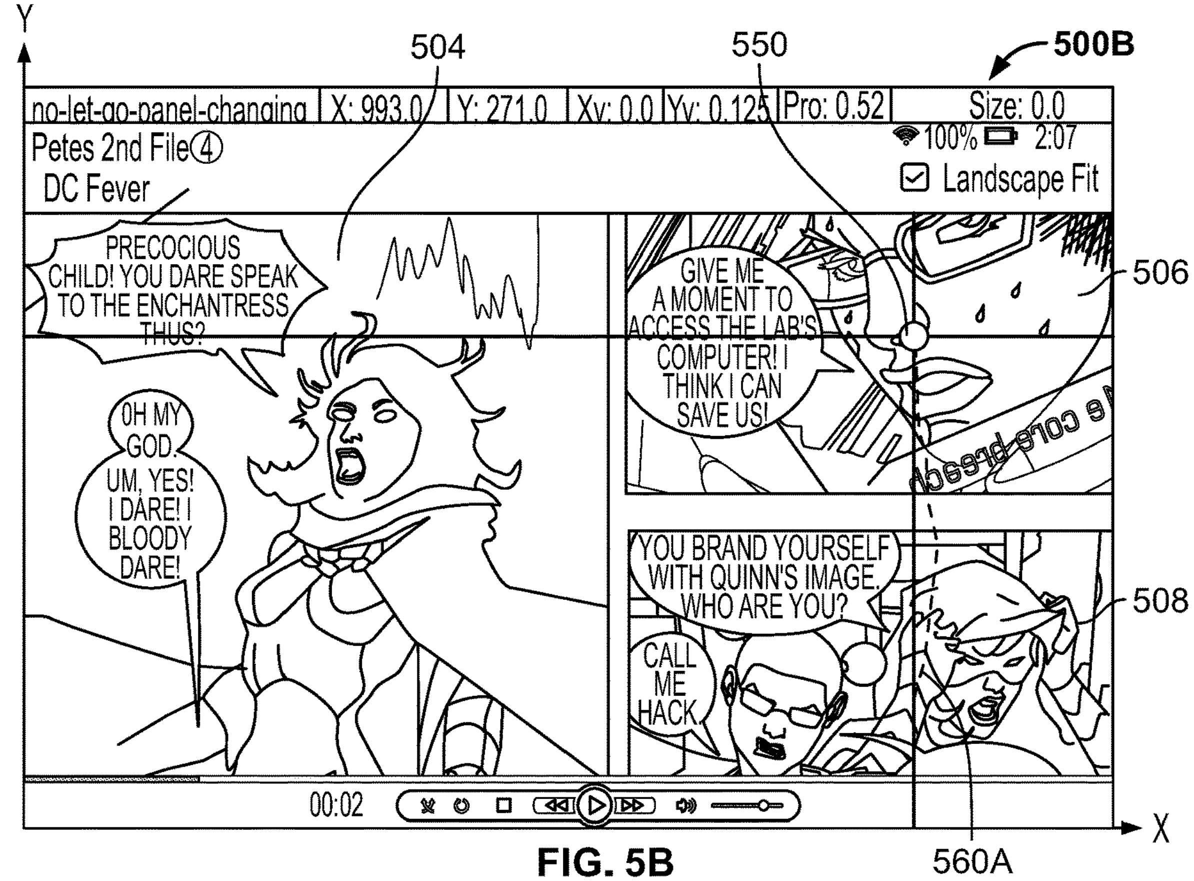
Figure 5C:
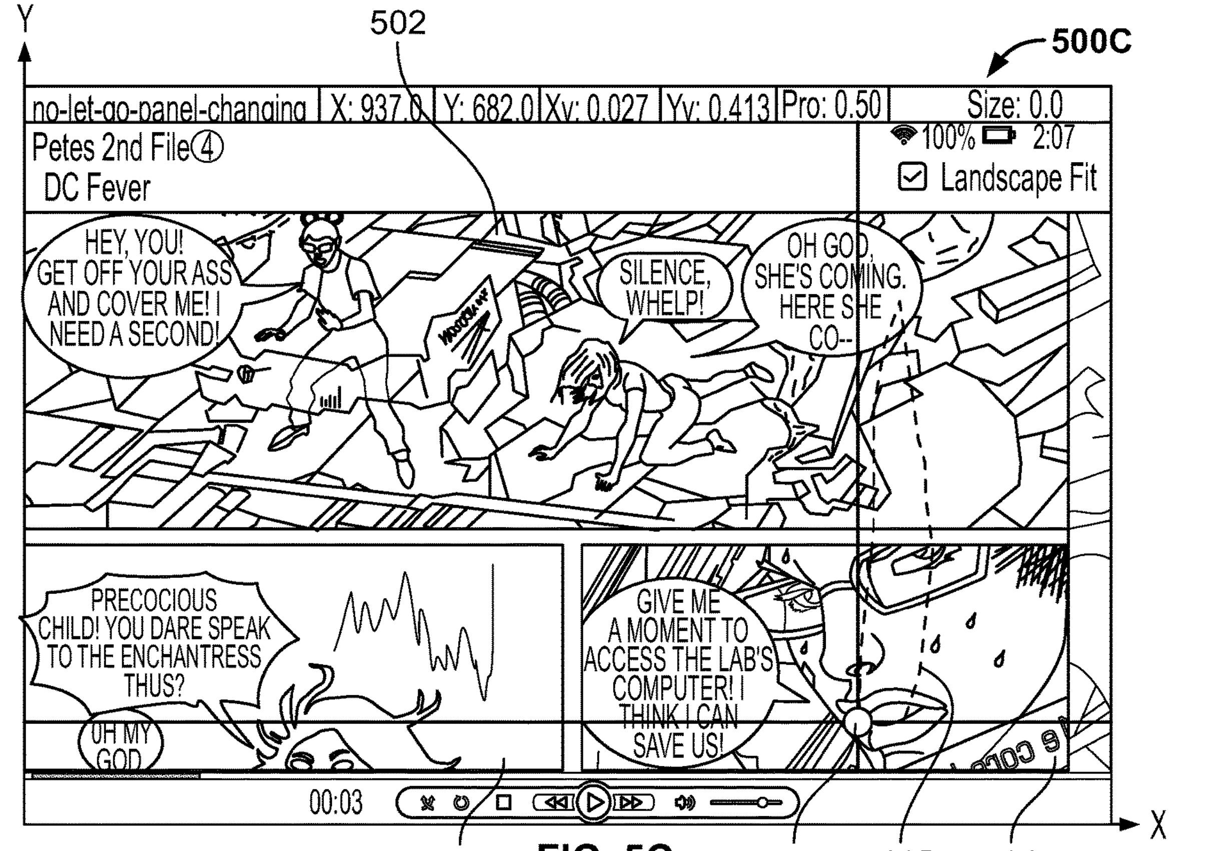
Figure 5D:
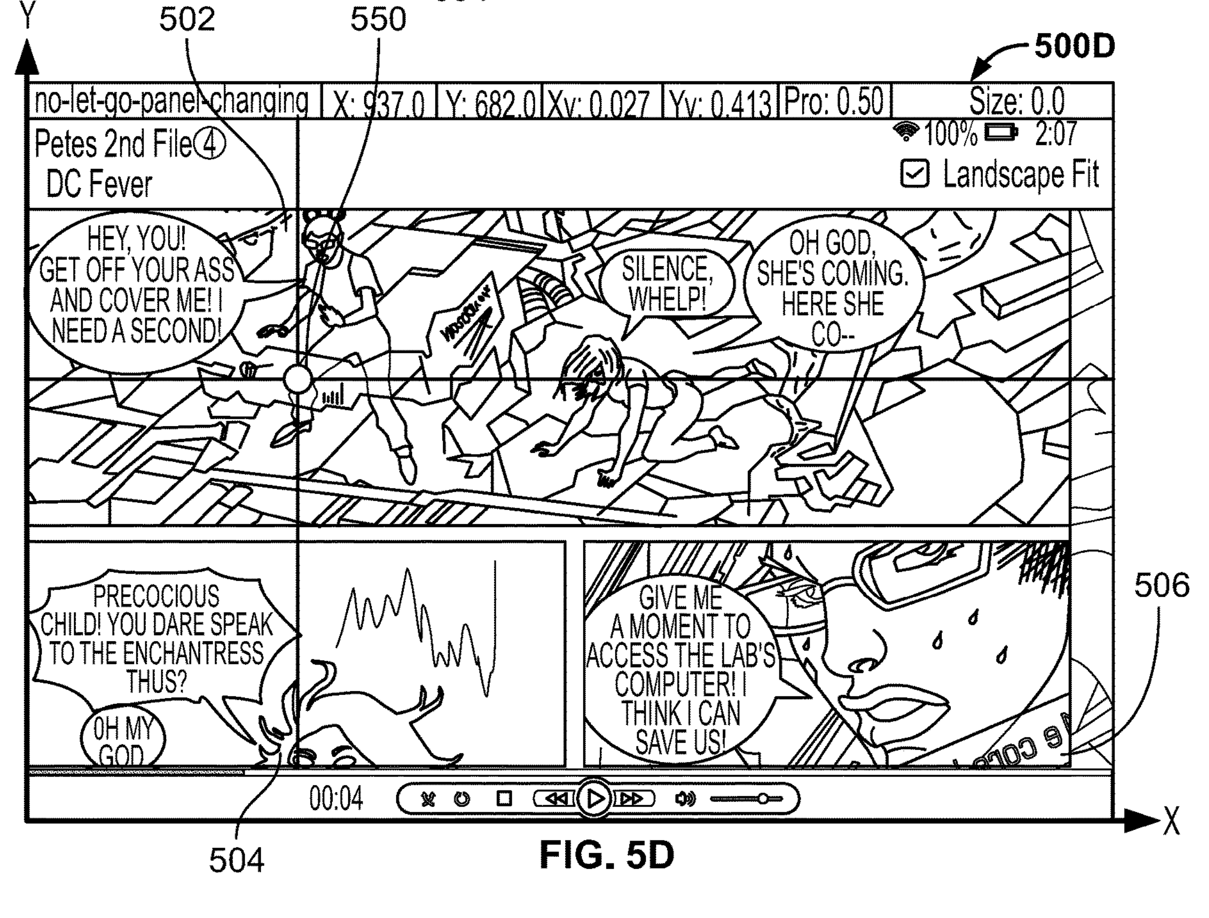
Figure 5E:
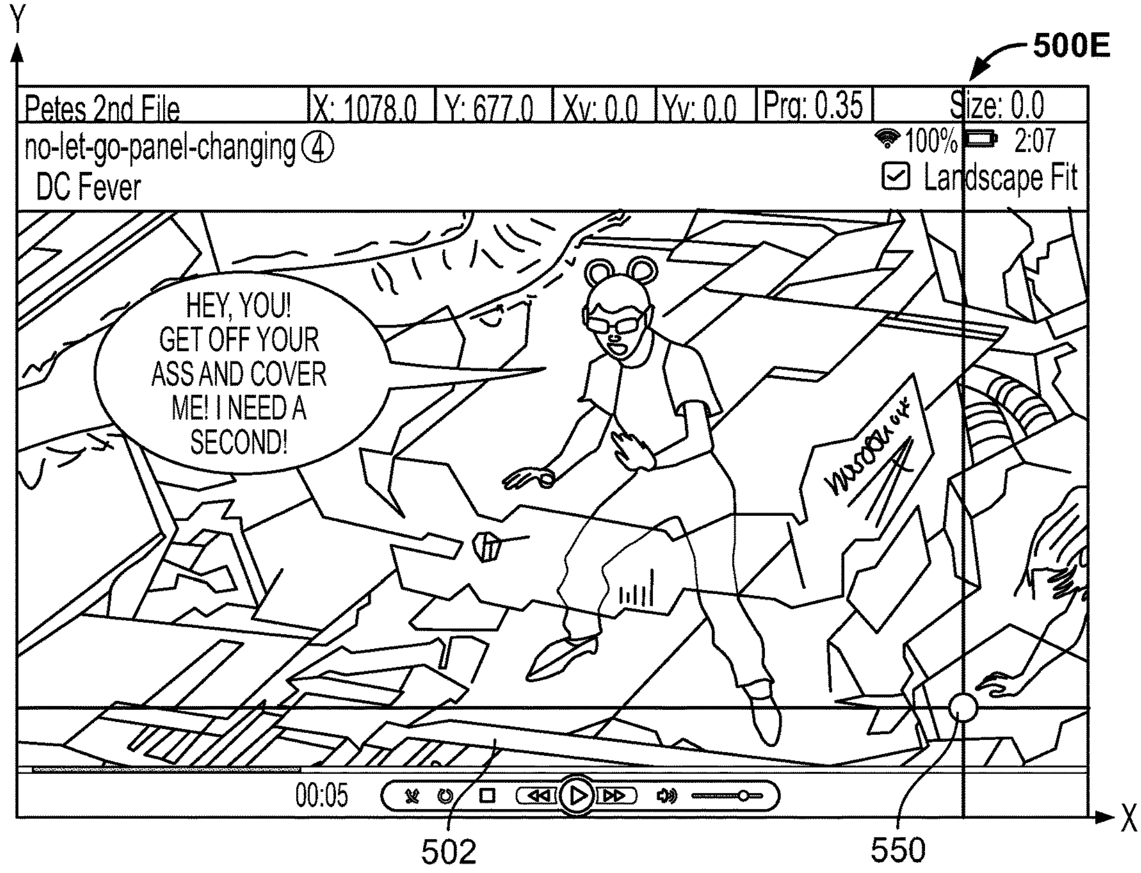
Figure 5F:
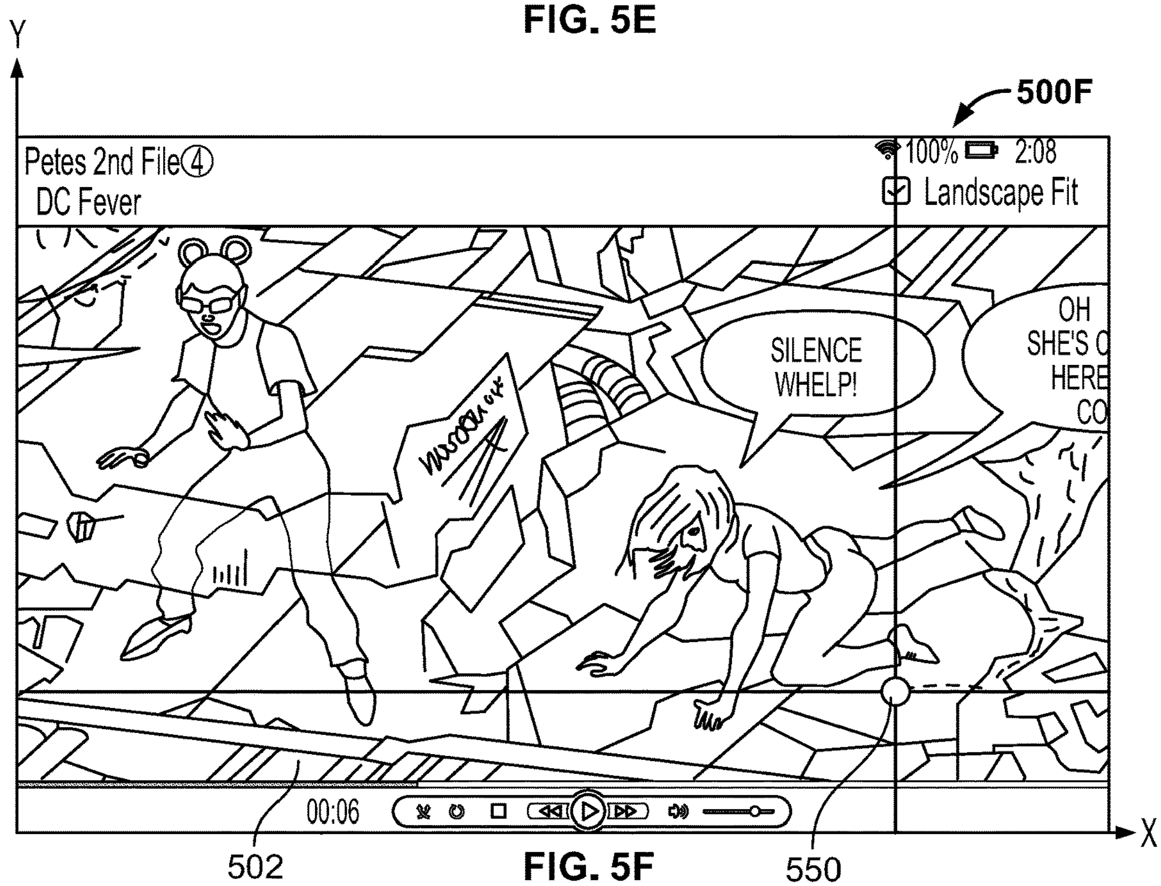
Figure 5G:
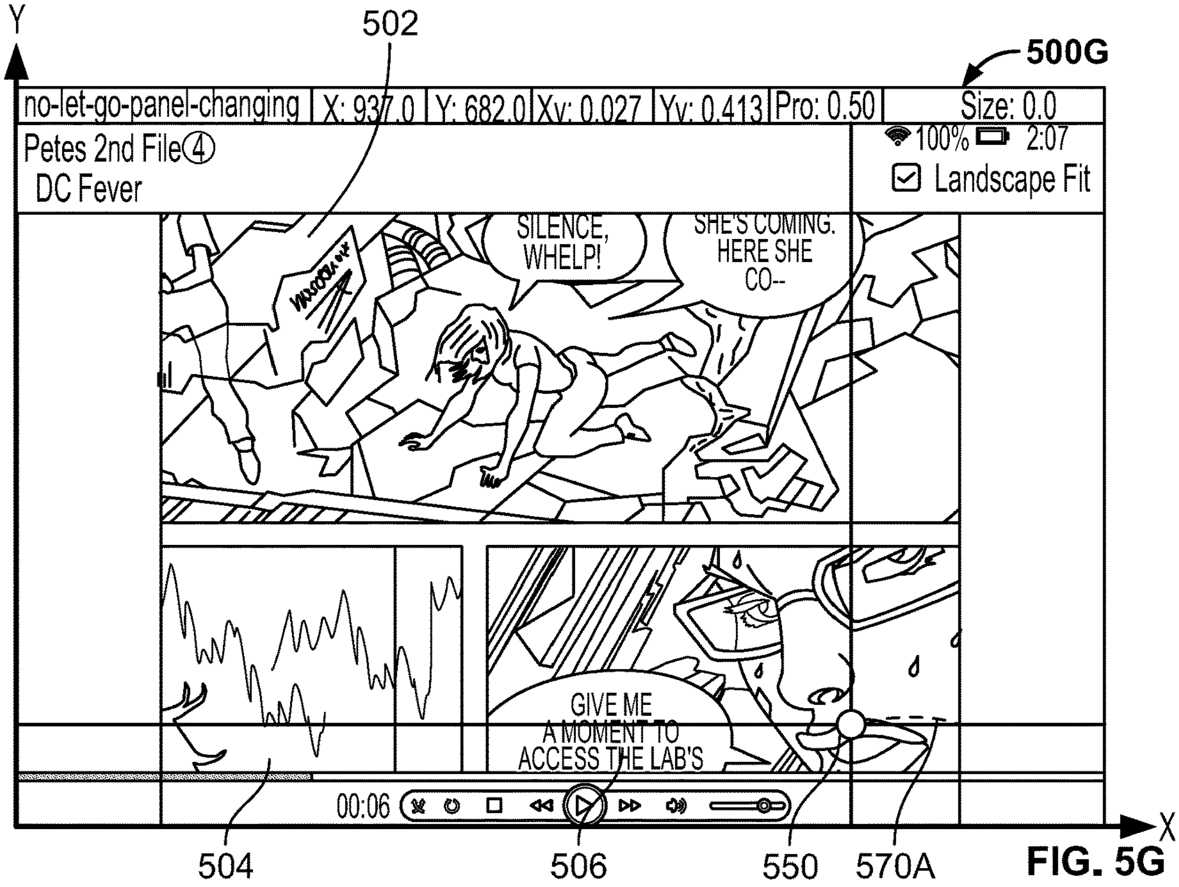
Figure 5H:
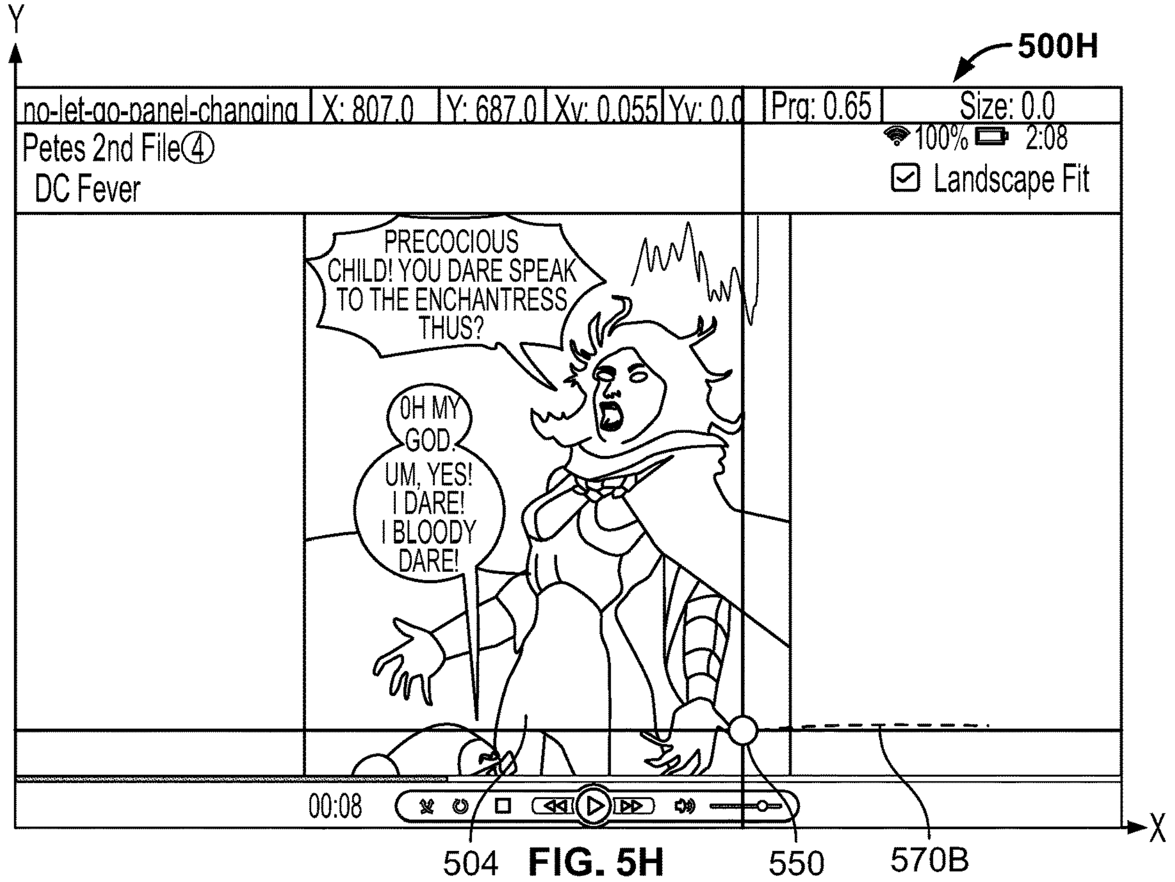
Figure 5I:
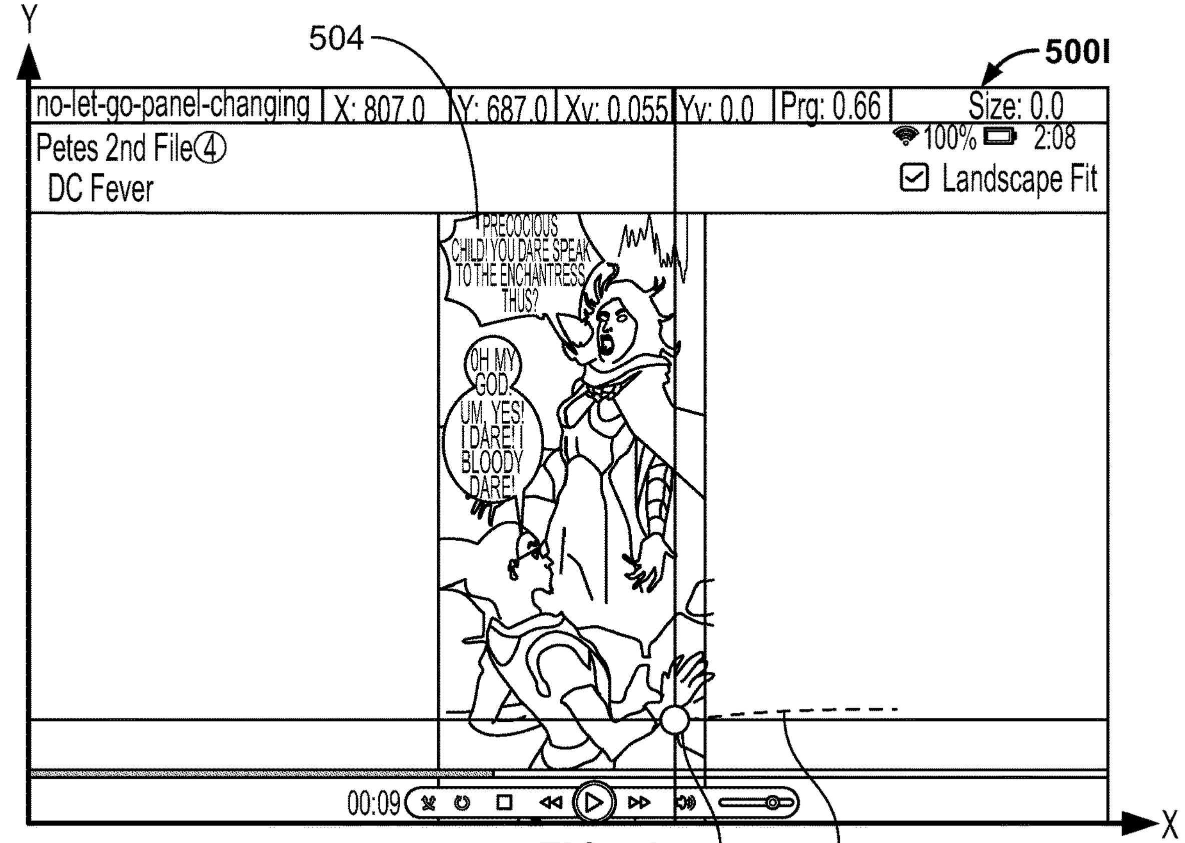
Figure 5J:
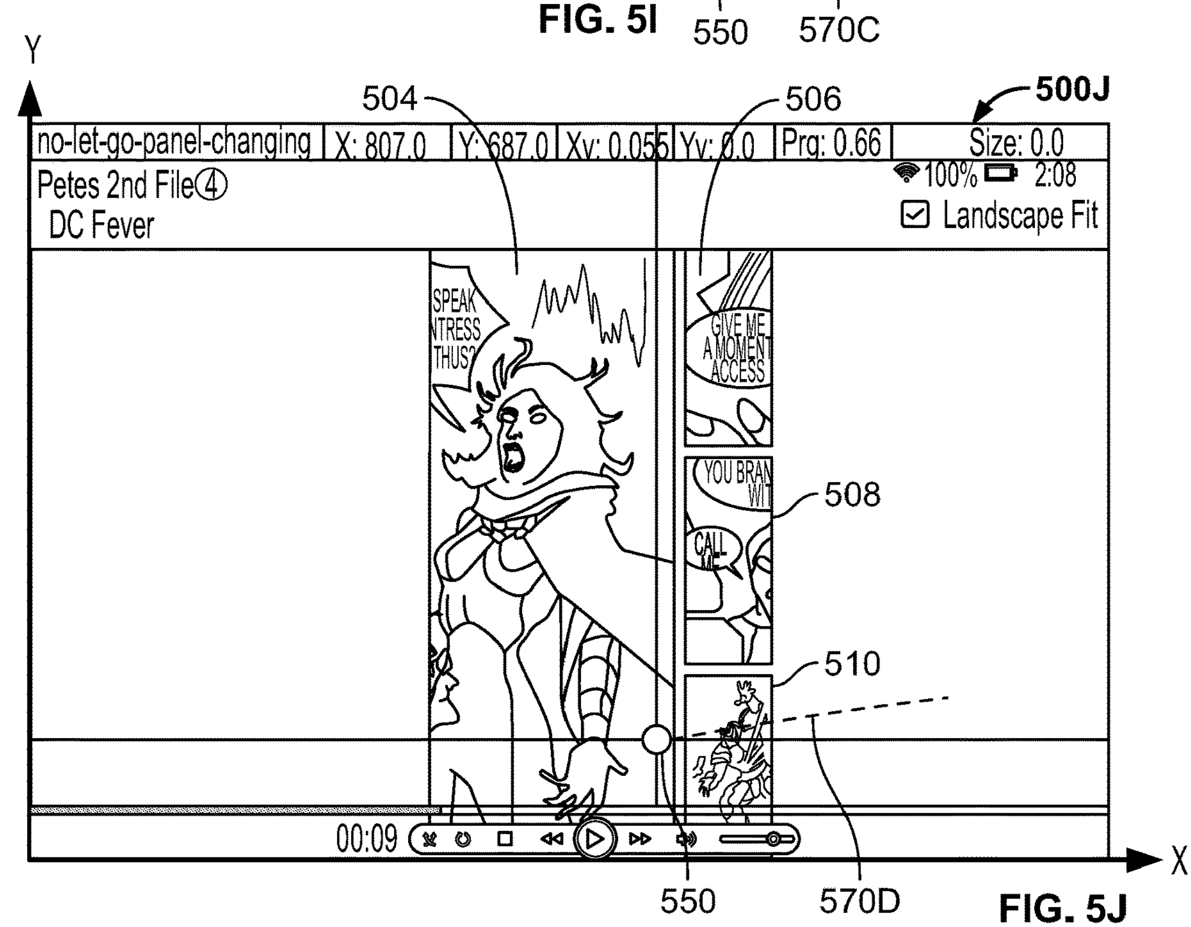
Figure 5K:
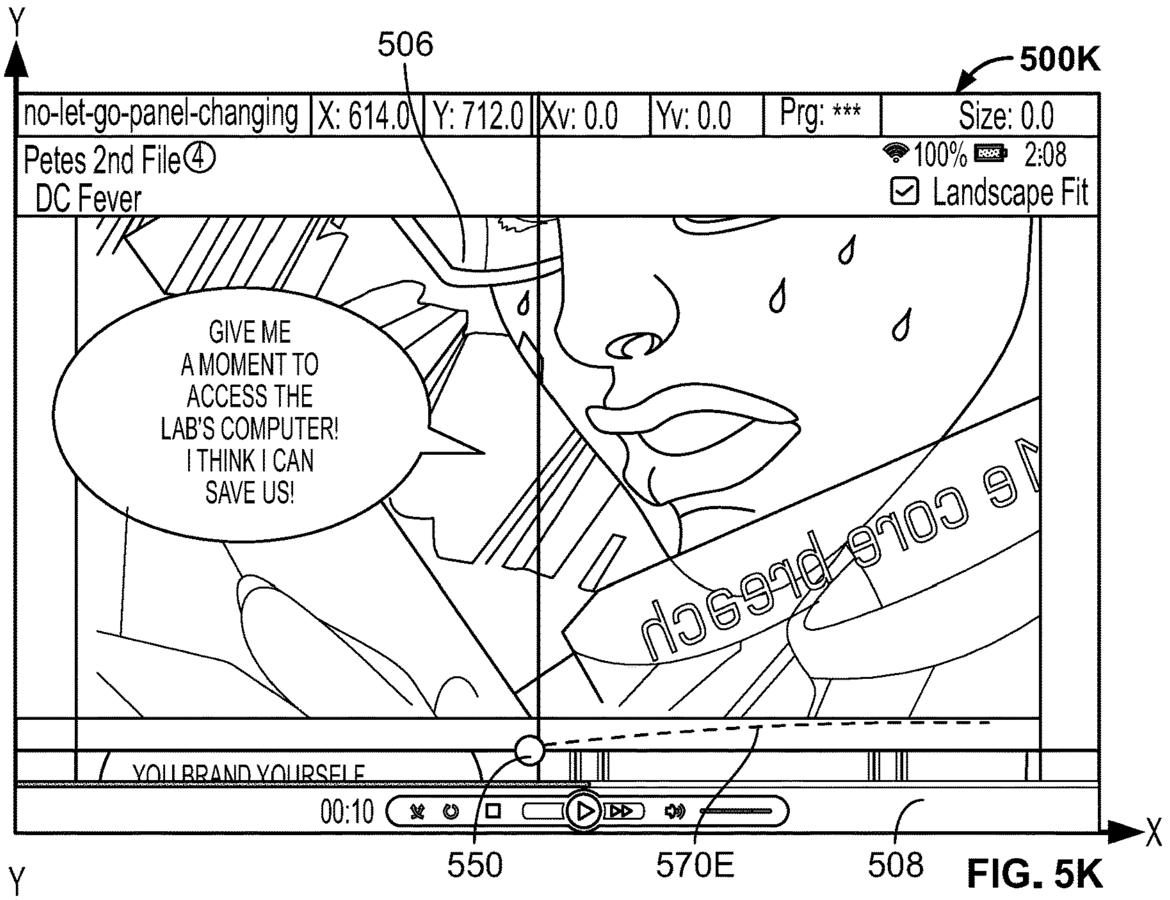
Figure 5L:
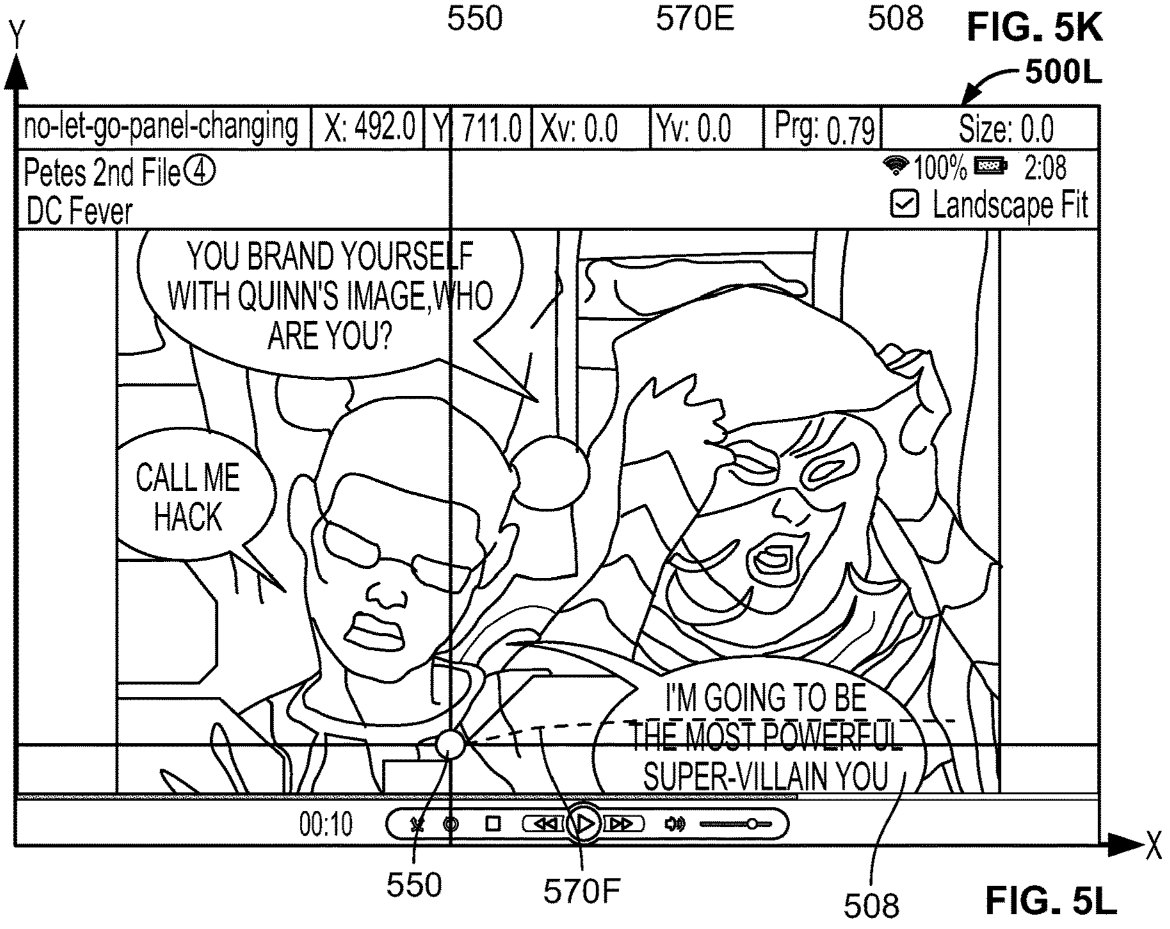
Figure 5M:
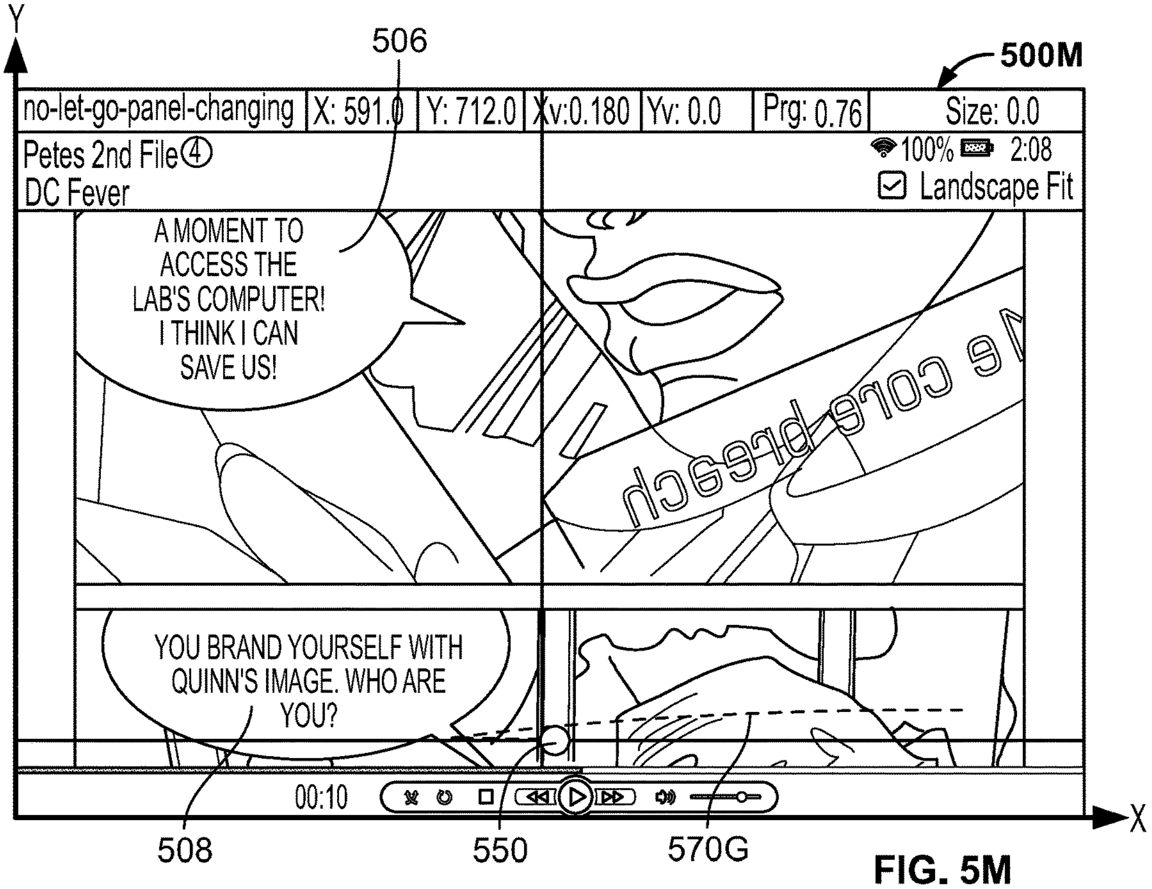
Figure 5N:
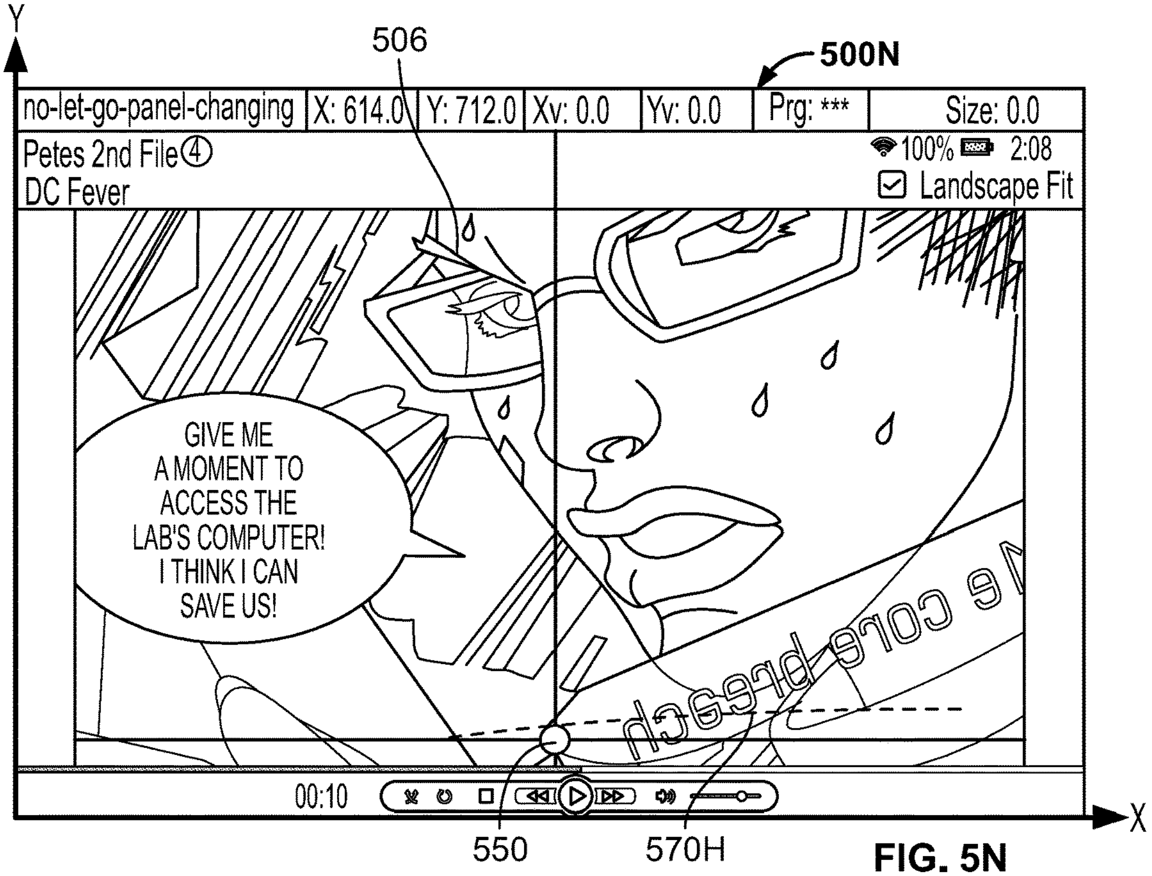
Figure 5O:
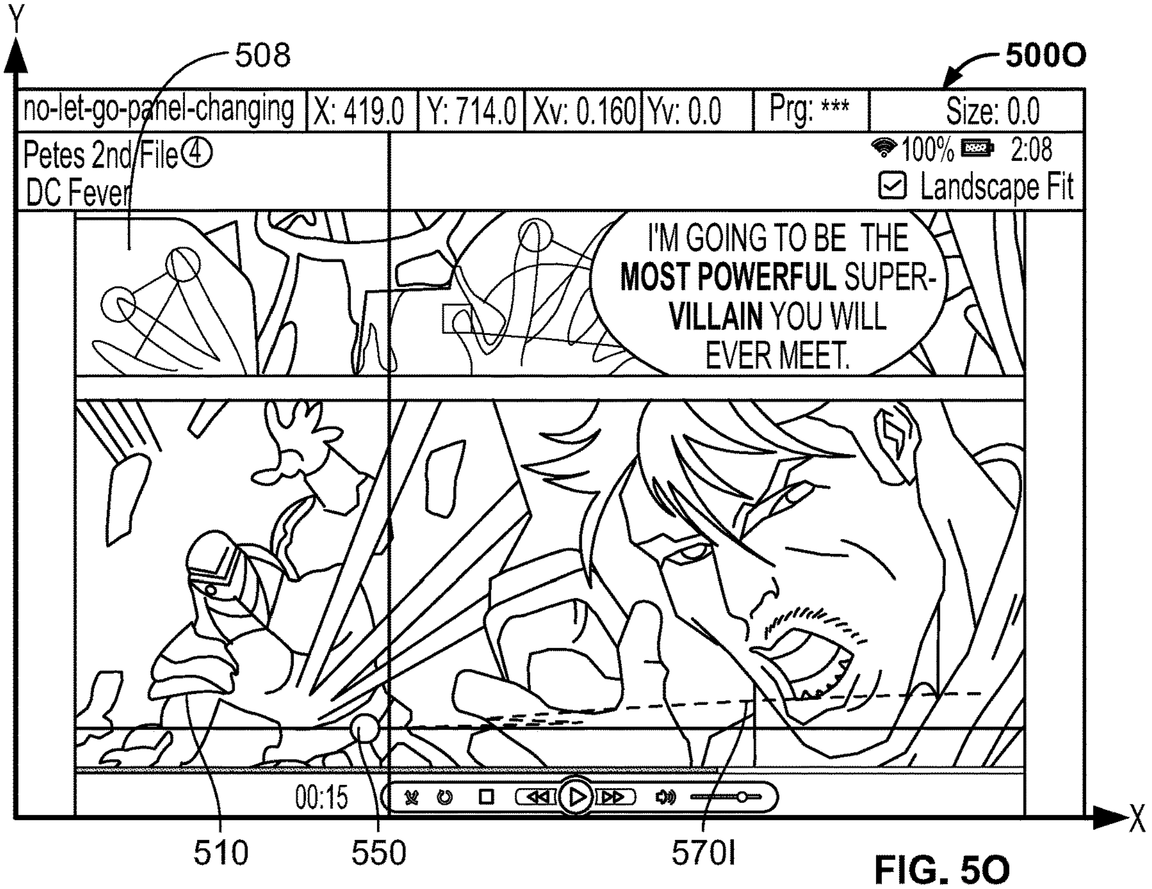
Figure 5P:
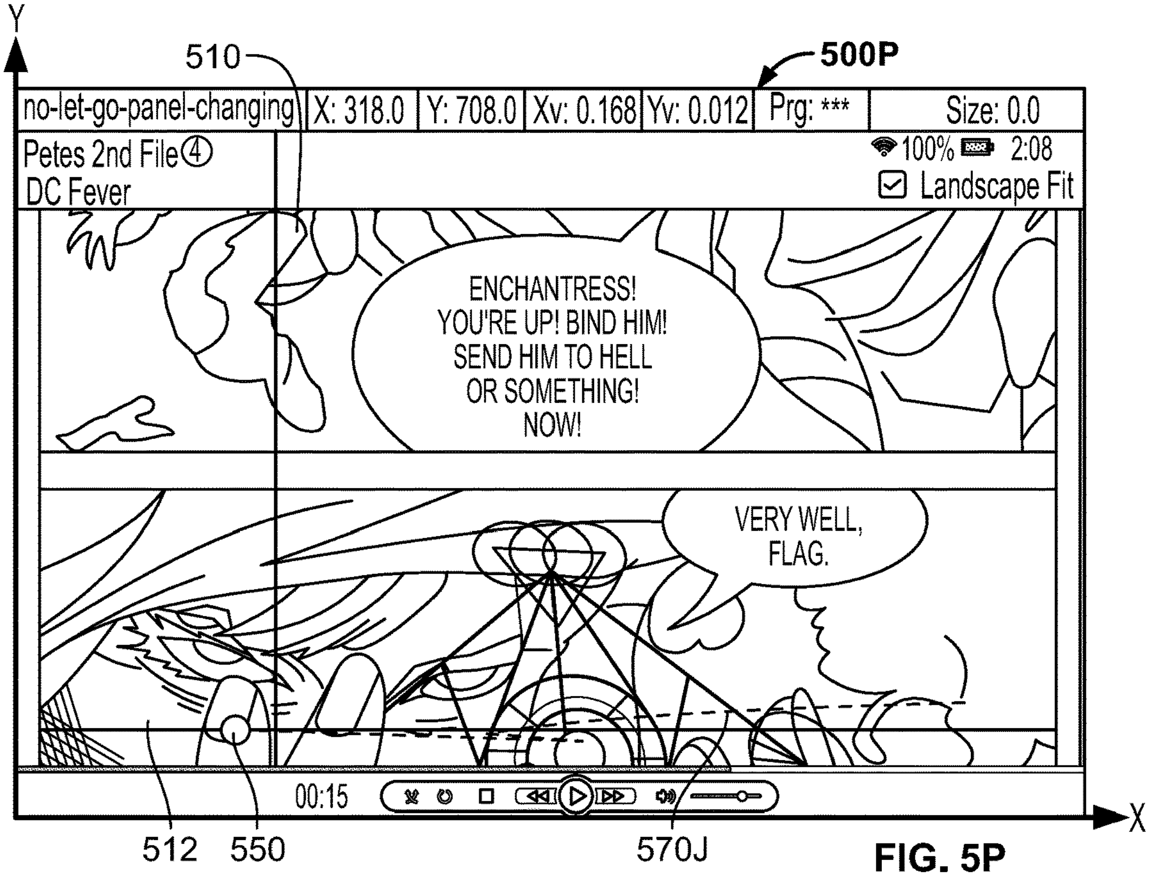
Figure 5Q:
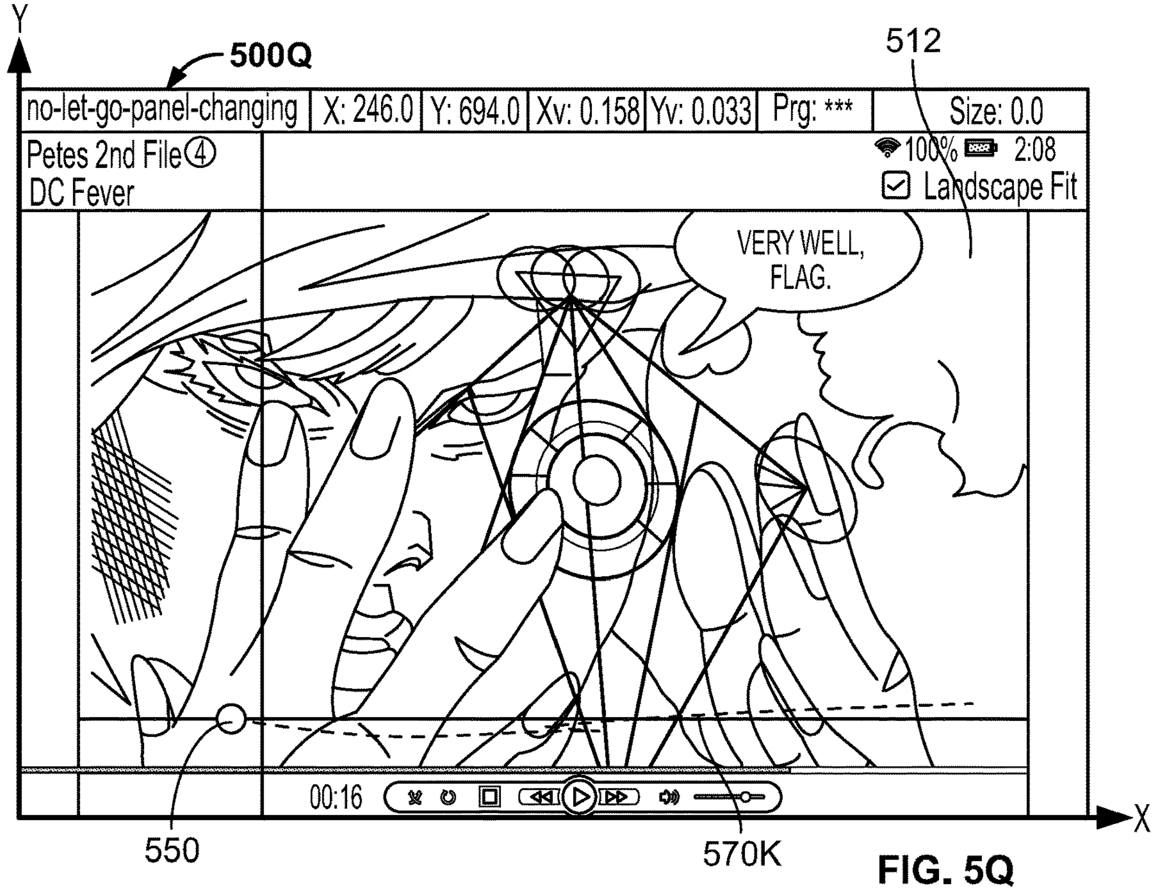
Figure 5R:
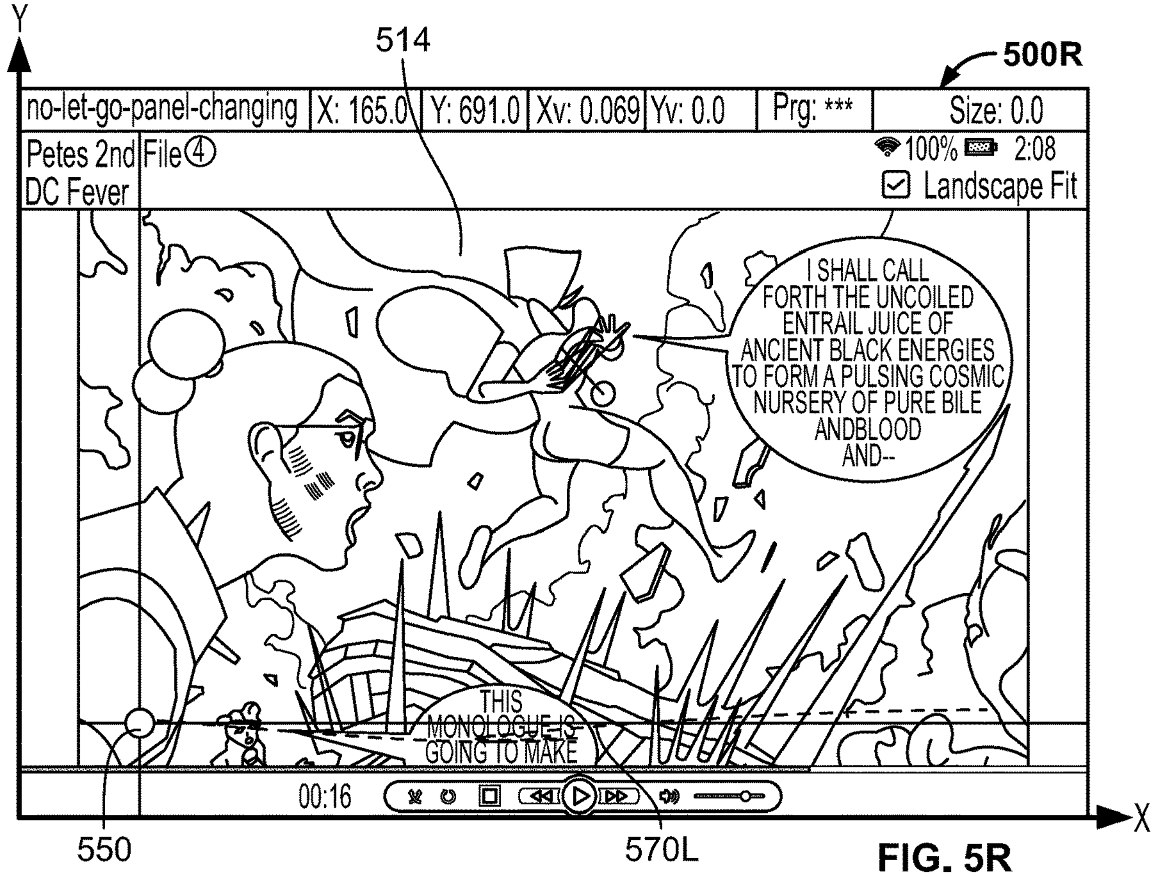
Figure 5S:
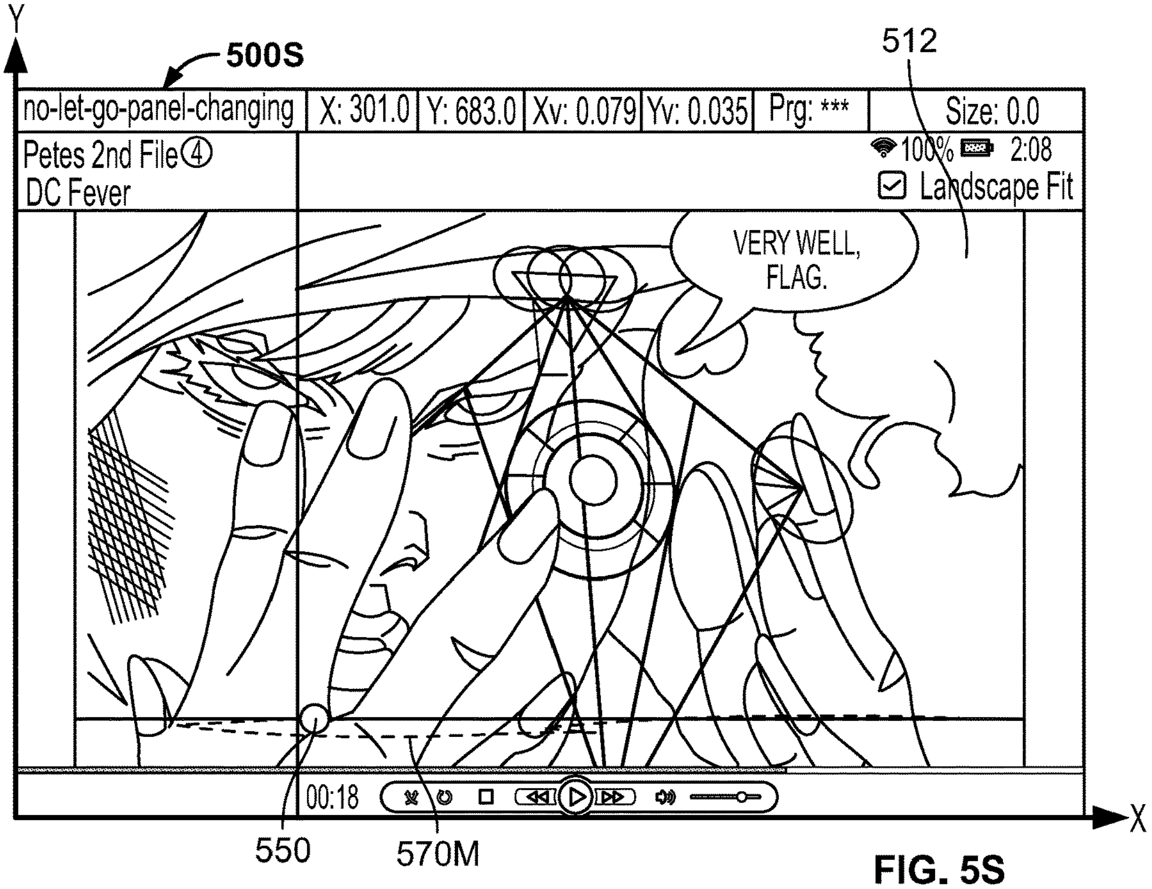
Figure 5T:
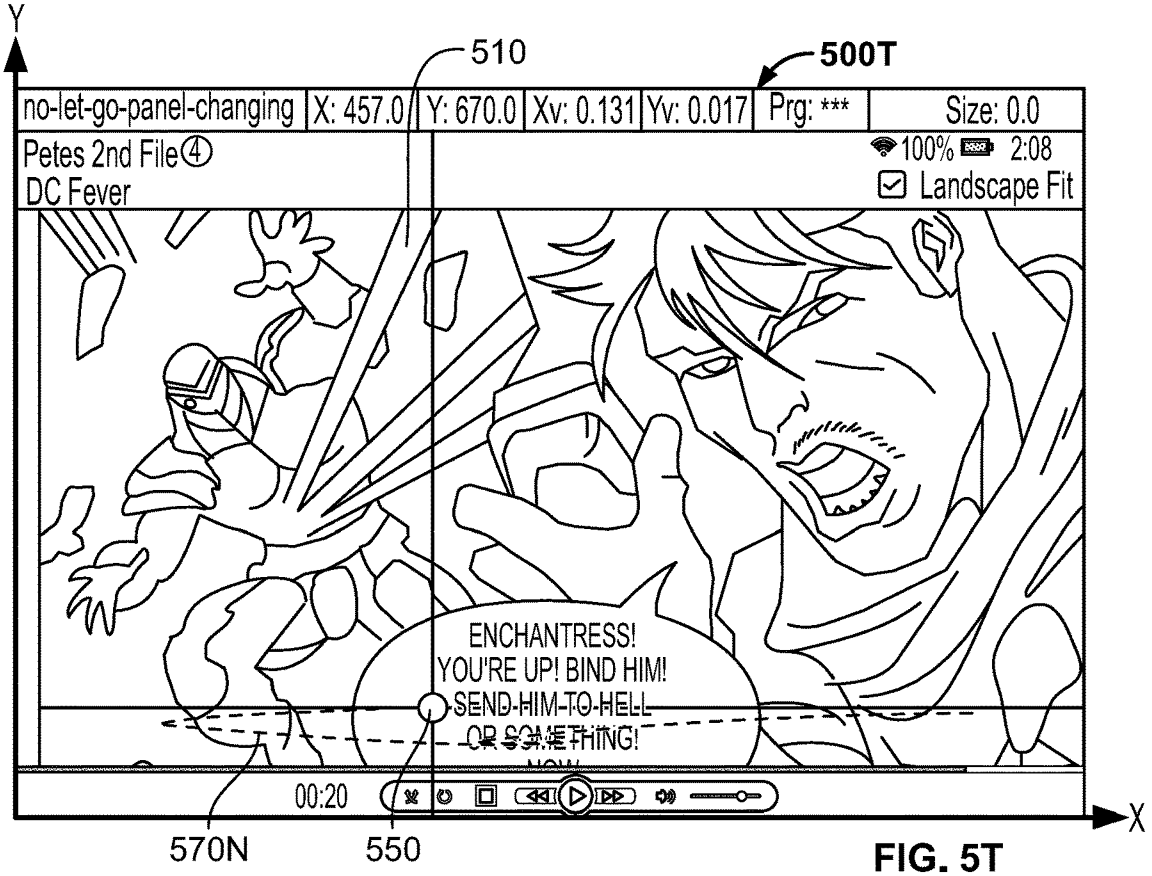
Figure 5U:
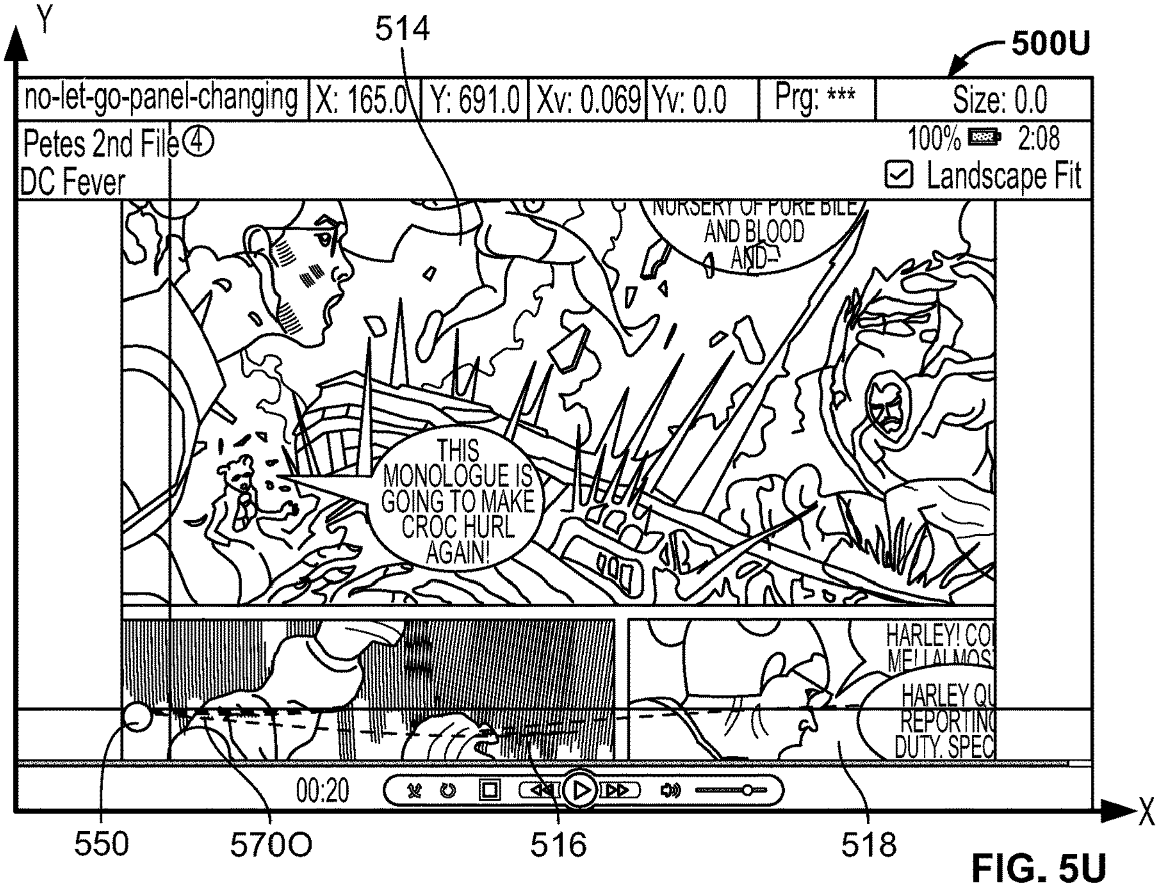
Figure 5V:
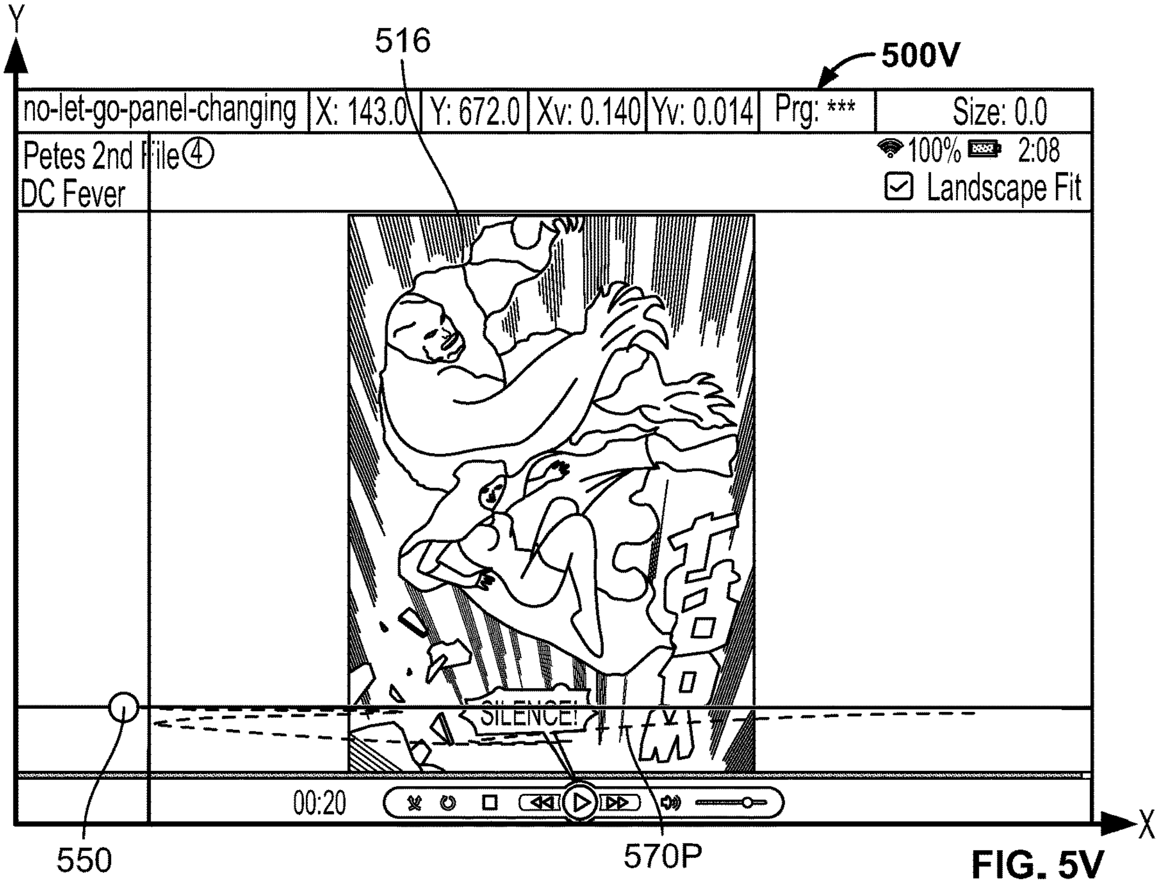

FIGS. 5A-V are screenshots illustrating screen movement relative to finger movement and placement for an implementation of the new scrolling method by a reader application interacting with user input. The screenshots illustrate operations of algorithms as described elsewhere herein, for example in connection with FIGS. 3 and 6. Each of the screenshots includes a cursor indicator 550 which for purposes of the Figures indicates one-finger touch. In each screenshot, the lower edge of the screen coincides with an 'X' (horizontal) axis and the left edge of the screen coincides with a 'Y' (vertical) axis. The illustrated screenshots were taken from a video capture of an actual content navigation session using the reader application. The video bar and video controls near the 'X' axis are an artifact of the recording technique and play no role in the present technology. The images are displayed in a "landscape fit" mode that maximizes display width for any given panel. Other display modes are also possible.

Referring to FIG. 5A, screen 500A illustrates an initial touch location by the cursor 550 at the beginning of a session, in which the reader application is in page mode. The first three panels 502, 504 and 506 of the page are visible. In FIG. 5B, screen 500B shows the cursor 550 has been dragged upward by the user along the drag trail 560A. The drag trail 560A is shown as a dashed line, but the reader application may show the drag trail in any desired manner or not at all, depending on program settings and user preferences. In response to the cursor movement, the player device has scrolled the page content a proportionate amount upwards, causing the topmost panel 502 to disappear and bringing a lower panel 508 into view. In FIG. 5C, screen 500C, the user has dragged the cursor back down to near its original position, and shown by the subsequent drag trail 560B, returning the screen to its original position shown in screen 500A. The player device ignore horizontal movement of the cursor in "landscape fit" mode because the page is shown at maximum width. The reader application remains in page mode through screen 500C.

FIG. 5D shows a screen 500D immediately after the user has completed a gesture (e.g., a double tap) that places the reader application into panel mode and selects the tapped-on panel 502 for display. The drag trail 560A-C is gone, and the user has not yet dragged the cursor 550 to create a new trail. In response to entering panel mode and selection of the first panel 502, the reader zooms into the first panel 502 until it occupies the full screen height ('Y' axis). FIG. 5E shows the screen 500E after the first panel 502 is zoomed to full height and the user has reset the cursor 550 to the lower right corner by another finger touch, in preparation for dragging to the left. In the illustrated embodiment, dragging to the left corresponds to forward progression through the panel sequence, and dragging to the right corresponds to reverse movement. The reader application may allow the user to toggle these settings for personal preferences.

In FIG. 5F at screen 500F, the user has just started to drag the cursor to the left and the beginning of a draft trail is visible to right of the cursor. The panel 502 is starting to zoom out in preparation for a transition to the next panel 504. The amount of leftward drag movement may be just enough to trigger advancing to the next panel. In an alternative, the reader may begin the transition in anticipation of the next movement. For example, the amount of movement may exceed a first threshold for triggering an anticipated move, but less than a second threshold greater than the first threshold for completing the move. In FIG. 5G screen 500G, the two lower panels 504, 506 have come into view with the upper panel 502 and leftward cursor movement continues as shown by the longer drag trail 570A. The page has zoomed out enough to cause display of vertical black filler bars (shown as white vertical filler bars in the Figures) on either side of the page image, because the next panel 504 is much taller than wide and cannot fit on the screen without filler bars. Once horizontal movement has triggered advancing to the next panel, further movement may be ignored until the panel transition is complete or the motion is reversed, whichever comes first. This may prevent scrolling further ahead than intended during transitions. Transitions can be done instantaneously or using any suitable transition animation, for example a cross fade or a sliding mask. In the illustrated embodiment, a sliding mask is used to cross panel boundaries and a cross fade is used for page boundaries. In FIG. 5H at screen 500H only the second panel 504 is visible and the cursor 550 is still moving to the left as shown by the lengthened drag trail 570B. The entire panel 504 is visible in screen 500I, FIG. 5I. Leftward cursor 550 movement is evident from the drag trail 570C. In the illustrated embodiment, the reader application ignores vertical movement of the cursor 550 when in panel mode.

In FIG. 5J screen 500J, further leftward movement of the cursor 550 can be seen in the lengthening drag trail 570D, and the reader application is implementing a transition to the next panel 506. The reader is zooming into the page and scrolling the content down, using a sliding mask. Later panels 508, 510 in the page are also visible. At screen 500K, FIG. 5K, the next panel 506 is displayed while continued leftward movement of the cursor 500 evident in the drag trail 570E has triggered a transition to the next panel 508 and the transition sequence is already started. In FIG. 5L at screen 500L, the reader application has advanced to the next panel 508 while the drag trail 570F still shows no rightward movement of the cursor 550. In FIG. 5M at screen 500M, the reader application has begun a transition to the prior panel in the sequence in response to the reverse horizontal movement of the cursor 550 evident in the drag trail 570G. Both panels 506 and 508 are visible during the transition. At FIG. 5N screen 500N, the display shows only the third panel 506 and the cursor 500 is stationary or nearly stationary as shown by comparing the drag trail 570H to the prior trail 570G shown at screen 500M.

Leftward movement of the cursor 550 resumes. By FIG. 5O, the leftward movement has progressed about 20% of the screen width 500O as shown by the drag trail 570I and the reader application has in response progressed past panel 508 towards the next panel 510. By FIG. 5P screen 500P, the reader application has progressed past panel 510 almost to the next panel 512 while leftward movement continues as can be seen from the drag trail 570J. By FIG. 5Q screen 500Q, the reader has advanced to the last panel 512 on the first page and the cursor trail 570K shows the cursor is almost stationary.

Continued leftward movement of the cursor 550 is shown in the next screen 500R at trail 570L. The next panel 514 is on the following page so the transition from panel 512 to panel 514 has been by cross fade. Reverse (rightward) cursor 550 movement shown in trail 570M of screen 500S, FIG. 5S, moves the display back to last panel 512 of the previous page. Continued reverse movement of the cursor 550 is evident in the drag trail 570N shown in screen 500T FIG. 5T. The reverse movement causes the reader application to transition back to the prior panel 510. From there, substantial leftward movement of the cursor resumes as shown by drag trail 5700 in FIG. 5U, screen 500U. Panel movement has progressed past panel 514 on the following page and is transitioning to the next panel 516. A following panel 518 is also visible. By FIG. 5V, screen 500V, with just a little more leftward cursor 550 movement evident in the drag trail 570P, the next panel 516 fills the screen. The reader may progress through the remaining panels in similar fashion, picking up the cursor drag finger only when running out of space on the left. The number of finger taps needed to advance is reduced, and user comfort and control are increased.

Figure 6:
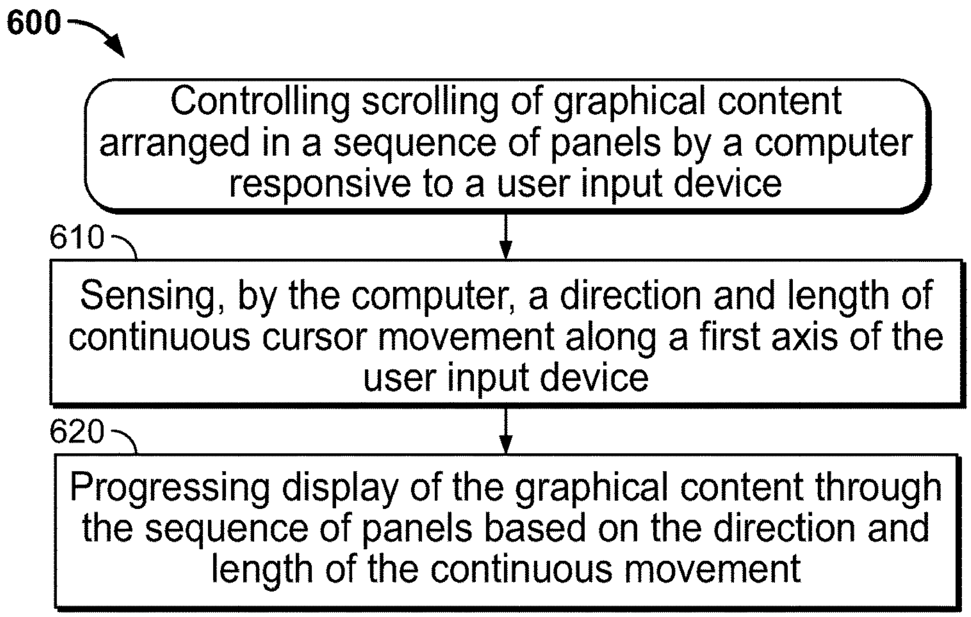
FIGS. 6-8 are flow diagrams illustrating aspects of processor operation for controlling scrolling of graphical content arranged in a sequence of panels by a computer responsive to a user input device.

In summary of the foregoing, and for additional disclosure, FIG. 6 shows aspects of a computer-implemented method 600 for controlling scrolling of graphical content arranged in a sequence of panels by a computer responsive to a user input device. The content may further comprise a sequence of pages containing the panels, as described in connection with FIG. 4. The method 600 may include additional details as shown or described in connection with FIGS. 2-5V and 7-8, for example the flow chart shown in FIG. 3. Other process flows may also be suitable. The method 600 may be performed by a client device for example, a mobile smart phone, a notepad computer, or a mixed reality display, and continue for so long as the reader wishes to read and view the content. Referring again to FIG. 6, the method 600 may include at 610, sensing, by the computer, a direction and length of continuous cursor movement along a first axis of the user input device. The computer may generate the cursor in response to a one-finger touch on a touchscreen or touchpad. In alternatives, the computer may generate the cursor in response to movement of a pointing device, e.g., a mouse, joystick, or similar controller. Sensing the cursor movement may include interpreting signals from a touchscreen, touchpad or pointing device. The method 600 works for continuous cursor movement along an axis, e.g., the 'X' (horizontal) axis of the display, enabling the user to scroll forwards and backwards through panel content without lifting a finger. The method can similarly be used to scroll through a sequence of pages. However, the method 600 may be more advantageous when used with smaller content pieces such as comic book panels that are read and viewed quickly, because it provides the advantage of eliminating the need for frequent finger tapping or similar repetitive clicking, etc., that is associated with finger or wrist fatigue.

The method 600 may further include, at 620, progressing display of the graphical content through the sequence of panels based on the direction and length of the continuous cursor movement. The screenshots shown in FIGS. 5A-V illustrate panel progression based on the direction and length of the continuous cursor movement. In addition, in page mode the client device may pan display of the graphical content along a second axis of the user input device perpendicular to the first axis, based on a direction and length of continuous cursor movement along the second axis. This action is illustrated in connection with FIGS. 5A-B and occurs only when the reader is in page mode. In either mode, the computer may progress the display using a set of instructions or script that controls the image or portion of image displayed on the screen in response to the cursor movement detected at 610. For example, in one embodiment, a proprietary script asset for a digital comic book was converted to a JavaScript™ Object Notation (JSON) script for implementing the flow shown in FIG. 3 and for controlling the graphical output of the client device. The JSON script coded other features, for example, transitions between panels and pages as described in connection with FIGS. 5A-V. Other programming languages and techniques may also be suitable.

Figure 7:
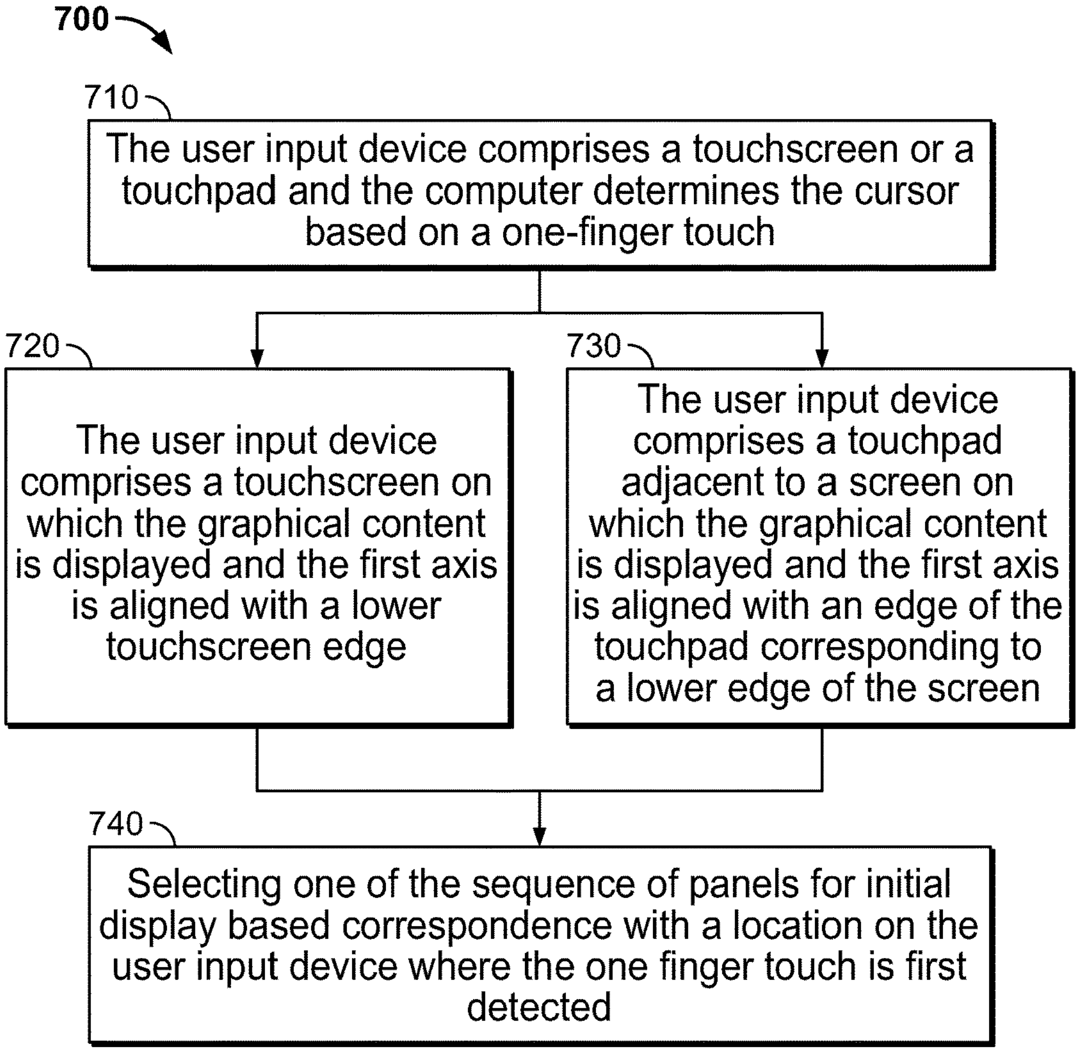
Figure 8:
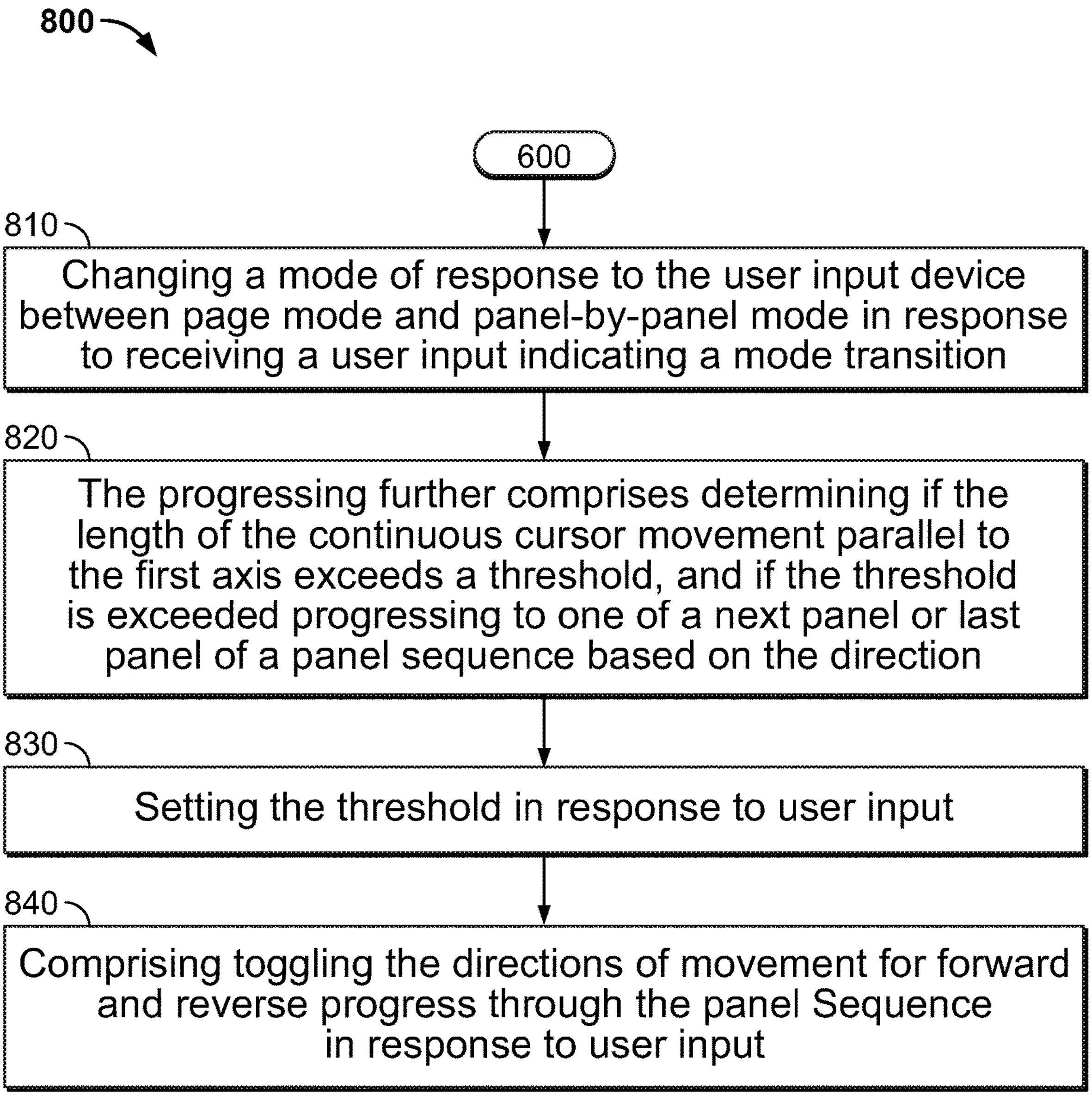

FIGS. 7-8 show further aspects and operations 700, 800 for use with the method 600. Any one or more of the further aspects or operations may apply to an embodiment of the method 600, in any operable order. The presence of one further aspect or operation does not mean that additional further aspects or operations must be present. Rather, the aspects and operations 700, 800 are described to illustrate some possible variations of the method 600.

Referring to FIG. 7 at 710, in an aspect, the user input device comprises a touchscreen or a touchpad and the computer determines the cursor based on a one-finger touch registered by the user input device. In one alternative shown at 720, the user input device comprises a touchscreen on which the graphical content is displayed and the first axis is aligned with a lower touchscreen edge. In another alternative at 730, the user input device comprises a touchpad adjacent to a screen on which the graphical content is displayed and the first axis is aligned with an edge of the touchpad corresponding to a lower edge of the screen. In another aspect, the method 600 may further include, at 740, selecting one of the sequence of panels for initial display-based correspondence with a location on the user input device where the one finger touch is first detected after an interruption of finger contact. Accordingly, the user can jump to a desired panel on a displayed page by touching the panel. If the panel is not visible, the user can place the client device in page mode using a finger gesture, page through the book as needed, then touch the screen at the location of the desired panel.

Referring to FIG. 8 at 810, the method 600 may further include changing a mode of response to the user input device between page mode and panel-by-panel mode in response to receiving a user input indicating a mode transition. User input for triggering mode transitions may be, or may include a finger or hand gesture, for example, a tap, double tap, swipe, pinch, or open.

In another aspect of the method 600, at 820, the progressing further includes determining if the length of the continuous cursor movement parallel to the first axis exceeds a threshold, and if the threshold is exceeded progressing to one of a next panel or last panel of a panel sequence based on the direction. An example of this technique is diagrammed in FIG. 3. It has the characteristic that finger movement does not initiate a transition to a next panel until the amount of movement passes a threshold. In an alternative, two or more thresholds may be used, a first lower threshold to initiate a transition to the next panel and a last higher threshold to confirm navigation to the next panel. If the latter threshold is not reached within a set time period, the transition can be reversed to navigate back to the original frame and the counter reset. In another alternative, the client controls panel transition in proportion to a threshold amount of movement. For example, if 1 cm of horizontal cursor movement is needed to complete a panel transition, the transition will begin as soon as movement is started, will be X % complete when X % of the threshold movement is finished, and so forth. A disadvantage of this approach is that the user must hold their finger still to keep each panel framed in the screen. Any one of these techniques, or other variations, can fall within the scope of the method 600.

In a related aspect, at 830, the method 600 may include setting the threshold in response to user input. For example, using a "setting" menu the user can specify the amount of movement needed to trigger a panel transition. The lower the threshold, the more sensitive the reader application will be to finger movement. Similarly, at 840, the method 600 may include toggling the directions of movement for forward and reverse progress through the panel sequence in response to user input. For example, the user can set whether leftward or rightward movement corresponds to forward progression through the panel sequence.

Figure 9:
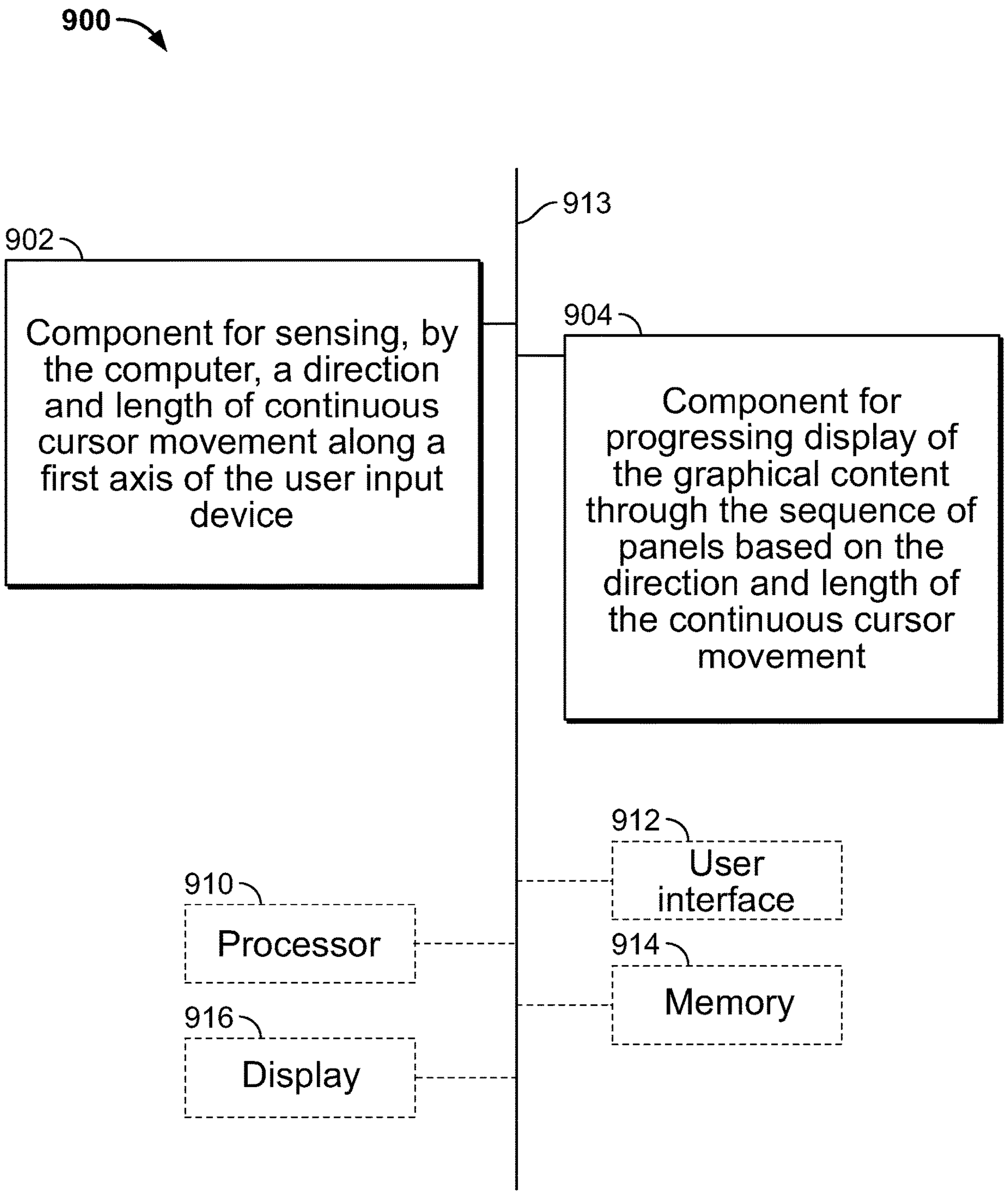
FIG. 9 is a block diagram illustrating aspects of a machine or apparatus for performing a method as shown in FIG. 6, with or without more detailed aspects or operations as described in connection with FIGS. 7-8.

In accordance with the foregoing Figures and accompanying disclosure, FIG. 9 illustrates components of an apparatus or system 900 for controlling scrolling of graphical content arranged in a sequence of panels by a computer responsive to a user input device. The apparatus or system 900 may include additional or more detailed components for performing functions or process operations as described herein. For example, the processor 910 and memory 914 may contain an instantiation of any operable combination of the processes 300, 600, 700 or 800. As depicted, the apparatus or system 900 may include functional blocks that can represent functions implemented by a processor, software, or combination thereof (e.g., firmware). The apparatus 900 may be a computer functioning as client device, e.g., a smartphone or notepad computer.

As illustrated in FIG. 8, the apparatus or system 900 may comprise an electrical component 902 for sensing, by the computer, a direction and length of continuous cursor movement touch along a first axis of the user input device. The component 902 may be, or may include, a means for said sensing. Said means may include the processor 910 coupled to the memory 914, and to a user interface device 912 (e.g., touchscreen, touchpad, or pointing device), the processor executing an algorithm based on program instructions stored in the memory. Such algorithm may include a sequence of more detailed operations, for example, the method 300 described in connection with FIG. 3, exclusive of blocks 314, 316 and 318.

The apparatus 900 may further include an electrical component 904 for progressing display of the graphical content through the sequence of panels based on the direction and length of the continuous cursor movement. The component 904 may be, or may include, a means for said progressing. Said means may include the processor 910 coupled to the memory 914 and to the display 916, the processor executing an algorithm based on program instructions stored in the memory. Such algorithm may include a sequence of more detailed operations, for example, as described in connection with blocks 314, 316 and 318 of FIG. 3, or the alternative algorithms described in connection with block 820 of FIG. 8.

The apparatus 900 may optionally include a processor module 910 having at least one processor. The processor 910 may be in operative communication with the modules 902-904 via a bus 913 or similar communication coupling. The processor 910 may initiate and schedule the processes or functions performed by electrical components 902-904.

In related aspects, the apparatus 900 may include a user interface device 912 operable for responding to user input and providing an electrical signal indicating the input to the processor 910. A user interface device 912 may include, for example, a touchscreen, a touchpad, a computer mouse, a game controller, or a gaze direction sensor. In further related aspects, the apparatus 900 may optionally include a module for storing information, such as, for example, a memory device 914. The computer readable medium or the memory module 914 may be operatively coupled to the other components of the apparatus 900 via the bus 913 or the like. The memory module 914 may be adapted to store computer readable instructions and data for effecting the processes and behavior of the modules 902-904, and subcomponents thereof, or the processor 910, or the operations 300, 700 or 800. The memory module 914 may retain instructions for executing functions associated with the modules 902-904. While shown as being external to the memory 914, it is to be understood that the modules 902-904 can exist within the memory 914.

The apparatus 900 may include a transceiver configured as a wireless transmitter/receiver, or a wired transmitter/receiver, for transmitting and receiving a communication signal to/from another system component. In alternative embodiments, the processor 910 may include networked microprocessors from devices operating over a computer network. In addition, the apparatus 900 may be equipped for communicating with networked computers of various types, for example other servers in a home network, cloud storage or remote network that store copies of digital content processed by the apparatus 900.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

As used herein, "virtual reality" is applied to content, applications or hardware that immerses a user in a virtual three-dimensional (3D) world, including, for example, various video game content, and animated film content. "Augmented reality" is applied content, applications or hardware that insert virtual objects into a user's perception of their physical environment. The term "mixed reality" includes both virtual reality and augmented reality. Virtual reality (VR) and augmented reality (AR) have been applied to various types of immersive video stereoscopic presentation techniques including, for example, stereoscopic virtual reality headsets. While described in connection with mobile device screens, the methods and apparatus described herein may be adapted for use with mixed reality gear by substitution of user inputs. For example, a touchpad of a mixed reality controller may be used as a touchpad for a laptop or as a touchscreen for a mobile device to provide cursor movement that triggers progression through a sequence of panels.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other format). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be apparent to those skilled in the art, and the technical disclosure herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method for controlling scrolling of graphical content by a computer responsive to a user input device comprising at least one of a touchscreen or touchpad, the method comprising:

displaying, while in a page mode, a plurality of panels together on the user input device;

in response to registering a user input on at least one of the touchscreen or the touchpad, transitioning to a panel mode of display wherein a first panel of the plurality of panels is exclusively displayed and occupies an entirety of a panel display area of the user input device;

sensing, by the computer while in the panel mode of display, a finger touch on the at least one of the touchscreen or the touchpad and a direction and length of continuous cursor movement along a first axis and a second axis of the user input device caused by movement of a finger while in continuous contact with the at least one of the touchscreen or the touchpad beginning with the finger touch;

triggering, responsive to determining that the length of continuous cursor movement along only the first axis exceeds a first threshold within a predetermined time threshold, a transition to a second panel adjacent to the second panel, wherein the transition comprises:

zooming out from the first panel to a state displaying at least a portion of the second panel; and zooming in on the second panel to display the second panel exclusively and fully occupy the panel display area of the user input device;

completing, responsive to determining that the length of continuous cursor movement exceeds a second threshold within the predetermined time threshold, the transition to the second panel;

sensing additional cursor movement caused by additional movement by the finger in the continuous contact with the at least one of the touchscreen or the touchpad along the first axis and the second axis of the user input device;

triggering, responsive to determining that the length of the additional cursor movement along only the first axis exceeds the first threshold within the predetermined time threshold, a transition to a third panel adjacent to the second panel;

completing, responsive to determining that the length of additional cursor movement exceeds the second threshold within the predetermined time threshold, the transition to the third panel; and resetting the cursor based on sensing interrupted finger contact with the at least one of the touchscreen or the touchpad.

2. The method of claim 1, further comprising panning display of the graphical content along a second axis of the user input device perpendicular to the first axis, based on a direction and length of continuous cursor movement along the second axis.

3. The method of claim 1, wherein the computer determines the cursor based on the finger touch registered by the user input device.

4. The method of claim 3, wherein the user input device comprises a touchscreen on which the graphical content is displayed and the first axis is aligned with a lower touchscreen edge.

5. The method of claim 3, wherein the user input device comprises a touchpad adjacent to a screen on which the graphical content is displayed and the first axis is aligned with an edge of the touchpad corresponding to a lower edge of the screen.

6. The method of claim 3, further comprising selecting one of the plurality of panels for initial display in the panel mode based on correspondence with a location on the user input device where the finger touch is first detected while in the page mode.

7. The method of claim 1, further comprising changing a mode of response to the user input device between the page mode and the panel mode in response to receiving the user input indicating a mode transition.

8. The method of claim 1, further comprising setting the second threshold in response to user input.

9. The method of claim 1, further comprising toggling the directions of movement for forward and reverse progress through the plurality of panels in response to changes in direction of the movement of the at least one finger.

10. An apparatus for controlling scrolling of graphical content by a computer responsive to a user input device, comprising:

a processor, a memory coupled to the processor, and a user input device comprising at least one of a touchscreen or touchpad coupled to the processor, wherein the memory holds instructions that when executed by the processor, cause the apparatus to perform: displaying, while in a page mode, a plurality of panels together;

in response to registering a user input on at least one of the touchscreen or touchpad, transitioning to a panel mode of display wherein a first panel of the plurality of panels is exclusively displayed and occupies an entirety of a panel display area of the user input device;

sensing, by the computer while in the panel mode of display, a finger touch on the at least one of the touchscreen or the touchpad and a direction and length of continuous cursor movement along a first axis and a second axis of the user input device caused by movement of a finger while in continuous contact with the at least one of the touchscreen or the touchpad beginning with the finger touch;

triggering, responsive to determining that the length of continuous cursor movement along only the first axis exceeds a first threshold within a predetermined time threshold, a transition to a second panel adjacent to the second panel, wherein the transition comprises:

zooming out from the first panel to a state displaying at least a portion of the second panel; and zooming in on the second panel to display it exclusively and fully occupy the panel display area of the user input device;

completing, responsive to determining that the length of continuous cursor movement exceeds a second threshold within the predetermined time threshold, the transition to the second panel;

sensing additional cursor movement caused by additional movement by the finger in the continuous contact with the at least one of the touchscreen or the touchpad along the first axis and the second axis of the user input device;

triggering, responsive to determining that the length of the additional cursor movement along only the first axis exceeds the first threshold within the predetermined time threshold, a transition to a third panel adjacent to the second panel;

completing, responsive to determining that the length of additional cursor movement exceeds the second threshold within the predetermined time threshold, the transition to the third panel; and resetting the cursor based on sensing interrupted finger contact with the at least one of the touchscreen or the touchpad.

11. The apparatus of claim 10, wherein the memory holds further instructions for panning display of the graphical content along a second axis of the user input device perpendicular to the first axis, based on a direction and length of continuous cursor movement along the second axis.

12. The apparatus of claim 10, wherein the memory holds further instructions for determining the cursor based on the finger touch registered by the user input device.

13. The apparatus of claim 12, wherein the user input device comprises a touchscreen on which the graphical content is displayed, and the first axis is aligned with a lower touchscreen edge.

14. The apparatus of claim 12, wherein the memory holds further instructions for selecting one of the plurality of panels for initial display in the panel mode based on correspondence with a location on the user input device where the finger touch is first detected while in the page mode.

15. The apparatus of claim 10, wherein the memory holds further instructions for changing a mode of response to the user input device between the page mode and the panel mode in response to receiving a user input indicating a mode transition.

16. The apparatus of claim 10, wherein the memory holds further instructions for setting the second threshold in response to user input.

17. The apparatus of claim 10, wherein the memory holds further instructions for toggling the directions of movement for forward and reverse progress through the plurality of panels in response to user input.

* * * * *